United States Patent
Yarabolu

(10) Patent No.: US 11,356,244 B2
(45) Date of Patent: Jun. 7, 2022

(54) GRAPHICAL USER INTERFACE USING CONTINUOUS AUTHENTICATION AND ENCRYPTION FOR SELECTIVE DISPLAY OF DATA

(71) Applicant: BANK OF AMERICA CORPORATION, Charlotte, NC (US)

(72) Inventor: Vijay Kumar Yarabolu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 248 days.

(21) Appl. No.: 16/893,559

(22) Filed: Jun. 5, 2020

(65) Prior Publication Data

US 2021/0385067 A1 Dec. 9, 2021

(51) Int. Cl.
| | |
|---|---|
| *H04L 9/06* | (2006.01) |
| *G06F 3/01* | (2006.01) |
| *H04L 9/32* | (2006.01) |
| *G02B 27/01* | (2006.01) |

(52) U.S. Cl.
CPC .......... *H04L 9/0643* (2013.01); *G02B 27/017* (2013.01); *G06F 3/013* (2013.01); *H04L 9/3231* (2013.01); *H04L 9/3242* (2013.01)

(58) Field of Classification Search
CPC ... H04L 9/0643; H04L 9/3231; H04L 9/3242; H04L 2209/805; H04L 9/3236; G02B 27/017; G02B 2027/014; G06F 3/013; G06F 3/0346
See application file for complete search history.

(56) References Cited

U.S. PATENT DOCUMENTS

| | | | | |
|---|---|---|---|---|
| 9,331,856 B1 * | 5/2016 | Song | ................... | G06F 21/36 |
| 9,749,137 B2 * | 8/2017 | Kundu | ................ | H04L 9/3226 |
| 10,511,731 B1 * | 12/2019 | Rao | ..................... | G06T 11/00 |
| 2015/0002676 A1 * | 1/2015 | Yoo | ..................... | H04N 7/181 |
| | | | | 348/159 |

(Continued)

FOREIGN PATENT DOCUMENTS

| | | | |
|---|---|---|---|
| CN | 111404664 A | * | 7/2020 |
| DE | 102016225262 A1 | * | 6/2018 |

(Continued)

*Primary Examiner* — Shahriar Zarrineh
(74) *Attorney, Agent, or Firm* — Moore & Van Allen PLLC; Nicholas C. Russell

(57) ABSTRACT

Embodiments of the invention are directed to a system, method, or computer program product structured for continuous authentication and encryption. In some embodiments, the system is structured for receiving content from an entity system, displaying the content as masked content, and determining, using cognitive analysis, that a user wearing smart glasses is viewing a first portion of the masked content through the smart glasses, where the first portion of the masked content is associated with a first content hash. The system is also structured for identifying a first decryption key associated with the first content hash and determining a first cognitive hash. The system is also structured for receiving a first wearable hash from the smart glasses, comparing the first cognitive hash to the first wearable hash, and in response to the first cognitive hash matching the first wearable hash, transmitting the first decryption key to the smart glasses.

18 Claims, 12 Drawing Sheets

(56) References Cited

U.S. PATENT DOCUMENTS

| | | | | |
|---|---|---|---|---|
| 2015/0113658 A1* | 4/2015 | Zhong | ................ | G02B 27/017 |
| | | | | 726/26 |
| 2015/0312533 A1* | 10/2015 | Moharir | ............... | H04N 5/2252 |
| | | | | 348/14.02 |
| 2016/0041613 A1* | 2/2016 | Klanner | ............. | G02B 27/0172 |
| | | | | 345/156 |
| 2016/0203796 A1* | 7/2016 | Kapinos | ................... | G09G 5/14 |
| | | | | 345/2.3 |
| 2016/0295038 A1* | 10/2016 | Rao | ....................... | H04W 40/02 |
| 2019/0081796 A1* | 3/2019 | Chow | ..................... | G06Q 20/02 |
| 2019/0244248 A1* | 8/2019 | Purves | .............. | G06Q 30/0261 |
| 2020/0074647 A1* | 3/2020 | Moon | ..................... | G08B 7/06 |
| 2020/0160748 A1* | 5/2020 | Hans | ..................... | G06V 20/64 |
| 2021/0321169 A1* | 10/2021 | Mohapatra | ......... | H04N 21/4858 |
| 2021/0373333 A1* | 12/2021 | Moon | ................ | G02B 27/0093 |

FOREIGN PATENT DOCUMENTS

| | | | | | |
|---|---|---|---|---|---|
| DE | 102017209802 | A1 | * | 12/2018 | |
| DE | 102018216613 | A1 | * | 4/2020 | ............ B60K 35/00 |
| EP | 3038061 | A1 | * | 6/2016 | ............ G06F 3/147 |
| JP | 6870401 | B2 | * | 5/2021 | |
| JP | 2021150866 | A | * | 9/2021 | |
| KR | 20170069425 | A | * | 6/2017 | |
| KR | 20200027392 | A | * | 3/2020 | |
| KR | 20200092331 | A | * | 3/2020 | |
| KR | 20200134401 | A | * | 12/2020 | |
| WO | WO-2015080341 | A1 | * | 6/2015 | ........... G02B 27/017 |
| WO | WO-2015144565 | A1 | * | 10/2015 | ......... G02B 27/0172 |
| WO | WO-2020063614 | A1 | * | 4/2020 | ........... G02B 27/017 |
| WO | WO-2020064813 | A1 | * | 4/2020 | ............ B60K 35/00 |

\* cited by examiner

GRAPHICAL USER INTERFACE USING CONTINUOUS AUTHENTICATION AND ENCRYPTION FOR SELECTIVE DISPLAY OF DATA

BACKGROUND

Personal user devices, such as laptops or smartphones, are used widely in various markets and industries. As such, many users may use their personal user devices to view electronic communications from various sources, such as electronic communications from entities with which these users hold accounts. However, because of the nature of personal user devices, third parties may be able to view these electronic communications, which may include sensitive or secure information relating to the user. Accordingly, there is a need for a system that allows the user to securely view electronic communications on their user device.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing systems, computer program products, and methods for continuous authentication and encryption. In some instances, the system comprises: a memory device with computer-readable program code stored thereon; a communication device; a display device; and a processing device operatively coupled to the memory device, communication device, and display, wherein the processing device is configured to execute the computer-readable program code to: receive content from an entity system; display the content as masked content via the display; determine, using cognitive analysis, that a user wearing smart glasses is viewing a first portion of the masked content through the smart glasses, wherein the first portion of the masked content is associated with a first content hash; identify a first decryption key associated with the first content hash; determine a first cognitive hash; receive a first wearable hash from the smart glasses; compare the first cognitive hash to the first wearable hash; and in response to the first cognitive hash matching the first wearable hash, transmit the first decryption key to the smart glasses.

In some embodiments, or in combination with any of the previous embodiments, the invention is further configured to: determine, using cognitive analysis, that the user wearing the smart glasses is viewing a second portion of the masked content through the smart glasses, wherein the second portion of the masked content is associated with a second content hash; identify a second decryption key associated with the second content hash; determine a second cognitive hash; receive a second wearable hash from the smart glasses; compare the second cognitive hash to the second wearable hash; and in response to the second cognitive hash matching the second wearable hash, transmit the second decryption key to the smart glasses.

In some embodiments, or in combination with any of the previous embodiments, determining the second cognitive hash comprises computing the second cognitive hash based on a hash algorithm and the first content hash.

In some embodiments, or in combination with any of the previous embodiments, the second wearable hash is computed based on the hash algorithm and the first content hash.

In some embodiments, or in combination with any of the previous embodiments, the system further comprises a camera and the cognitive analysis comprises using the camera to determine at least one of a movement of eyes of the user or a movement of the smart glasses.

In some embodiments, or in combination with any of the previous embodiments, the invention is further configured to receive cognitive data from the smart glasses, the cognitive data comprising at least one of data regarding a movement of eyes of the user or a movement of the smart glasses, wherein the cognitive analysis comprises using the cognitive data from the smart glasses.

In some embodiments, or in combination with any of the previous embodiments, displaying the masked content comprises displaying a plurality of content fields, wherein all identifying information of each content field is masked out.

In some embodiments, or in combination with any of the previous embodiments, displaying the masked content comprises displaying a plurality of content fields, wherein personal identification information of each content field is masked out.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
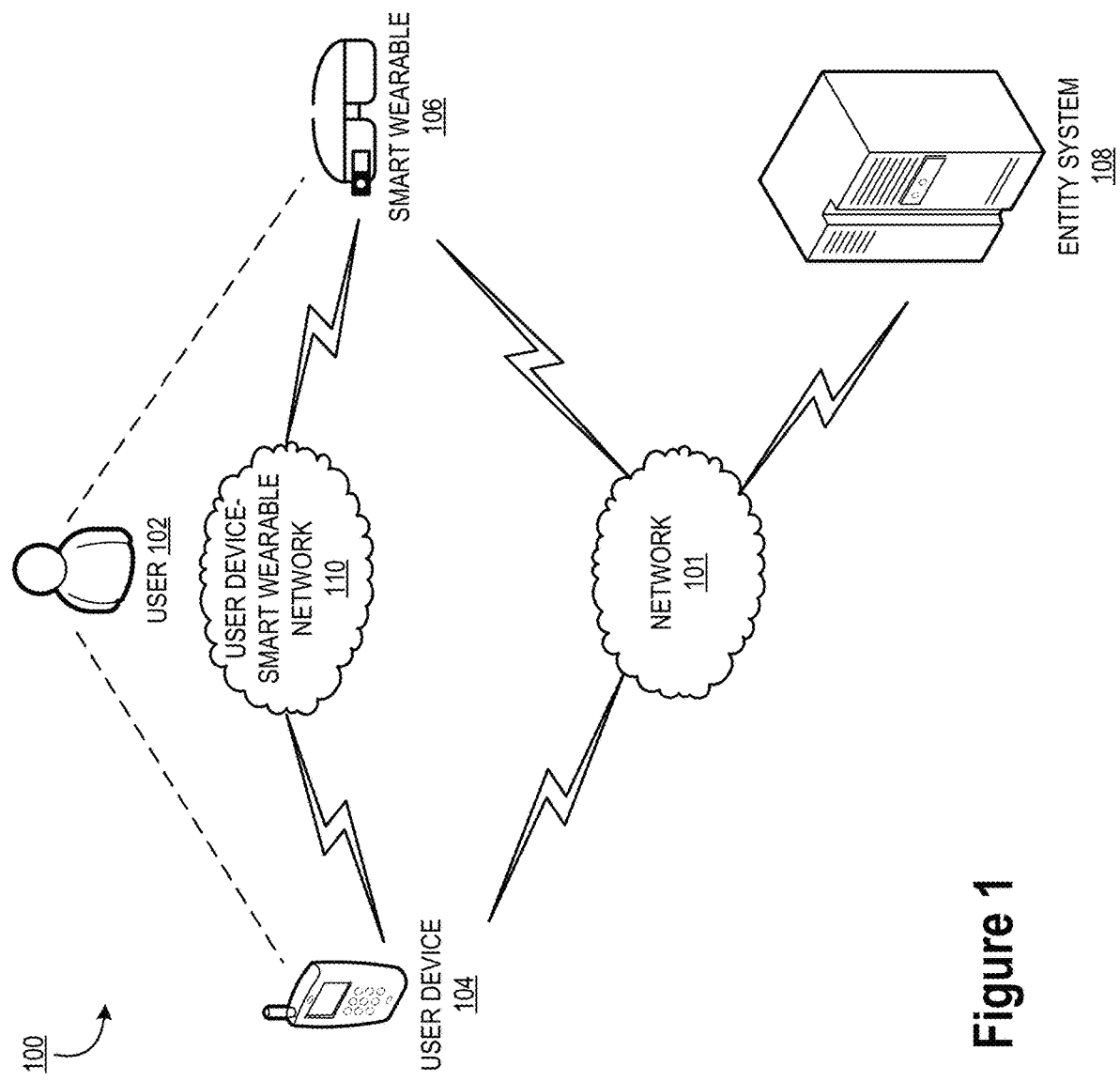
Figure 2:
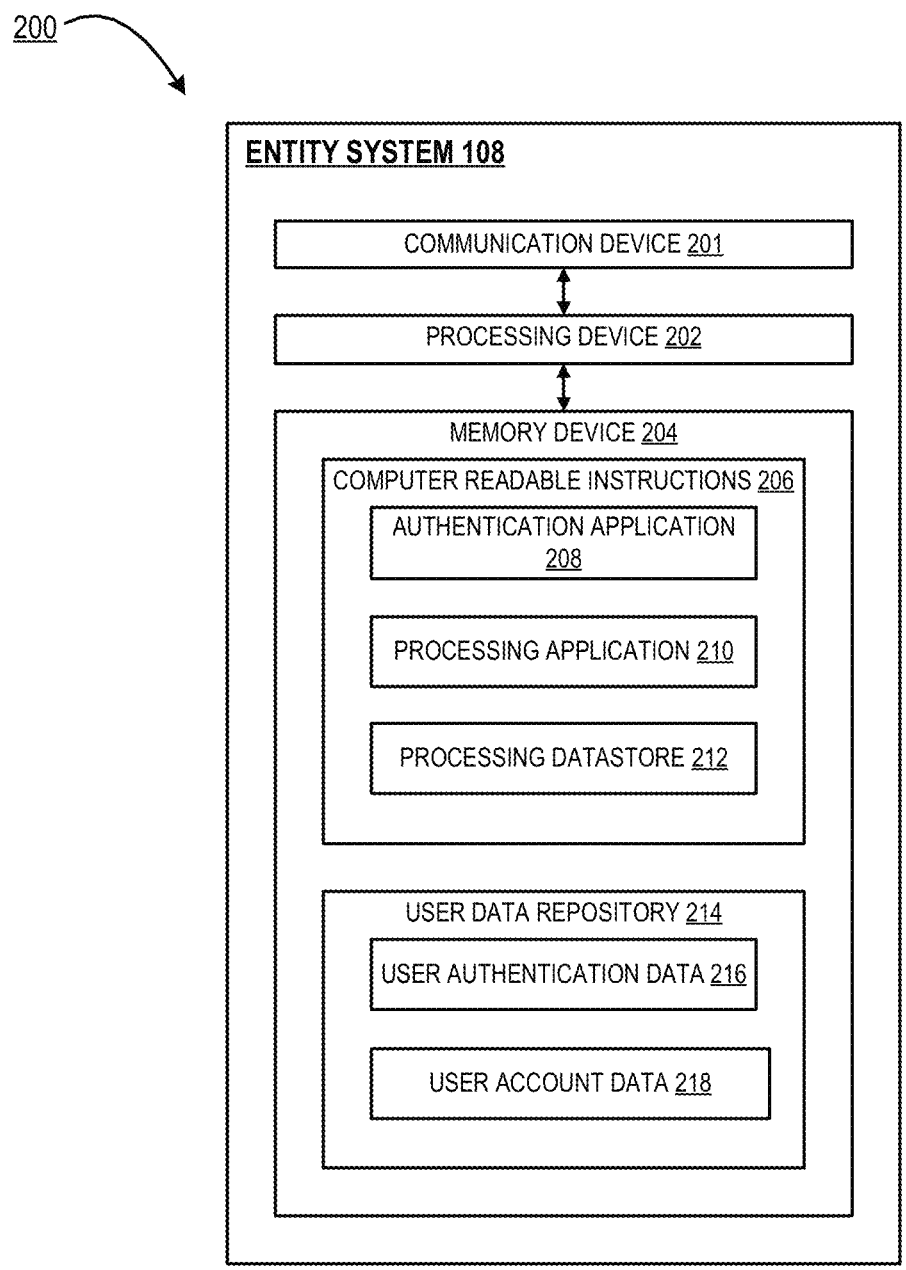
Figure 3:
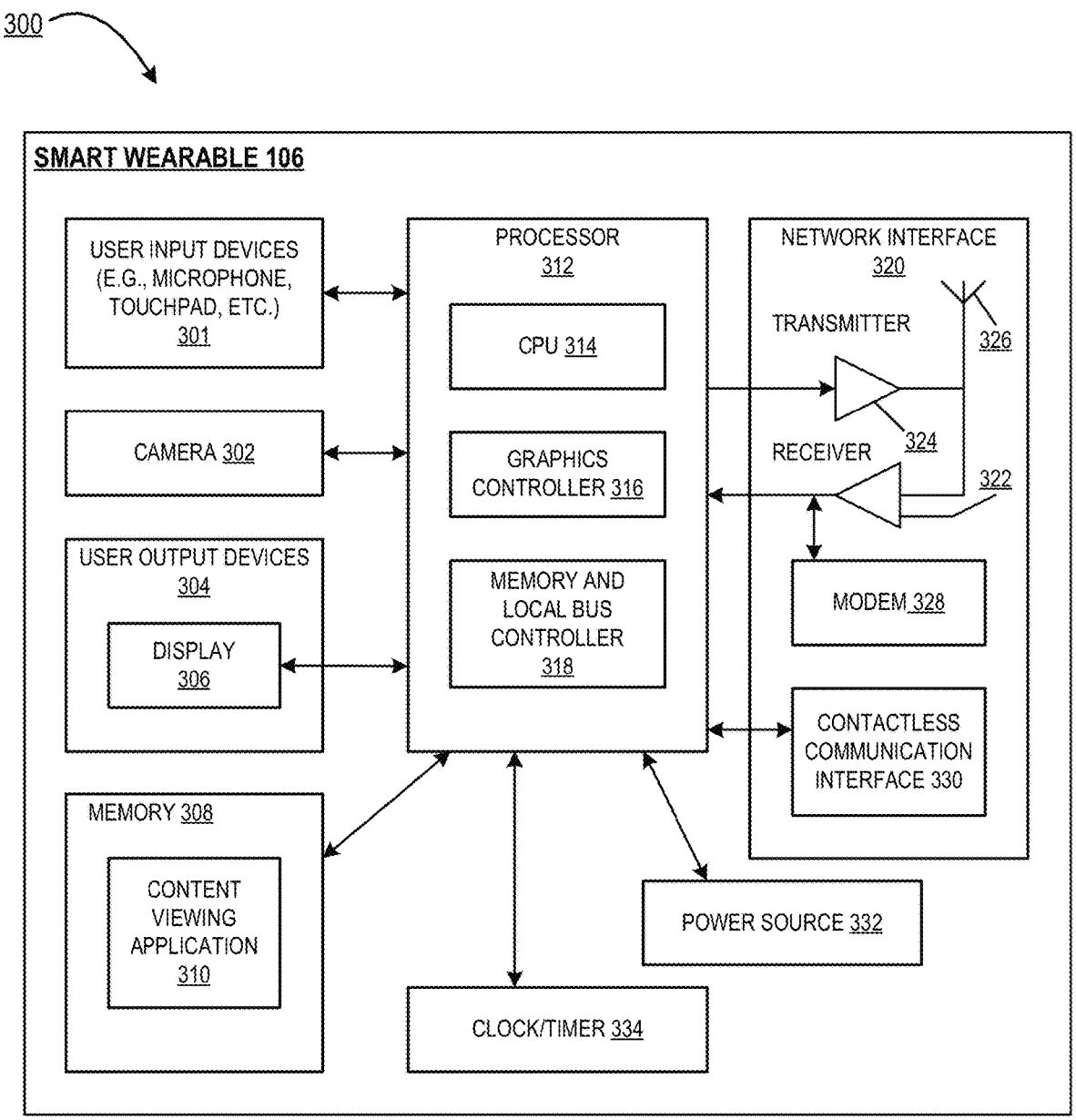
Figure 4:
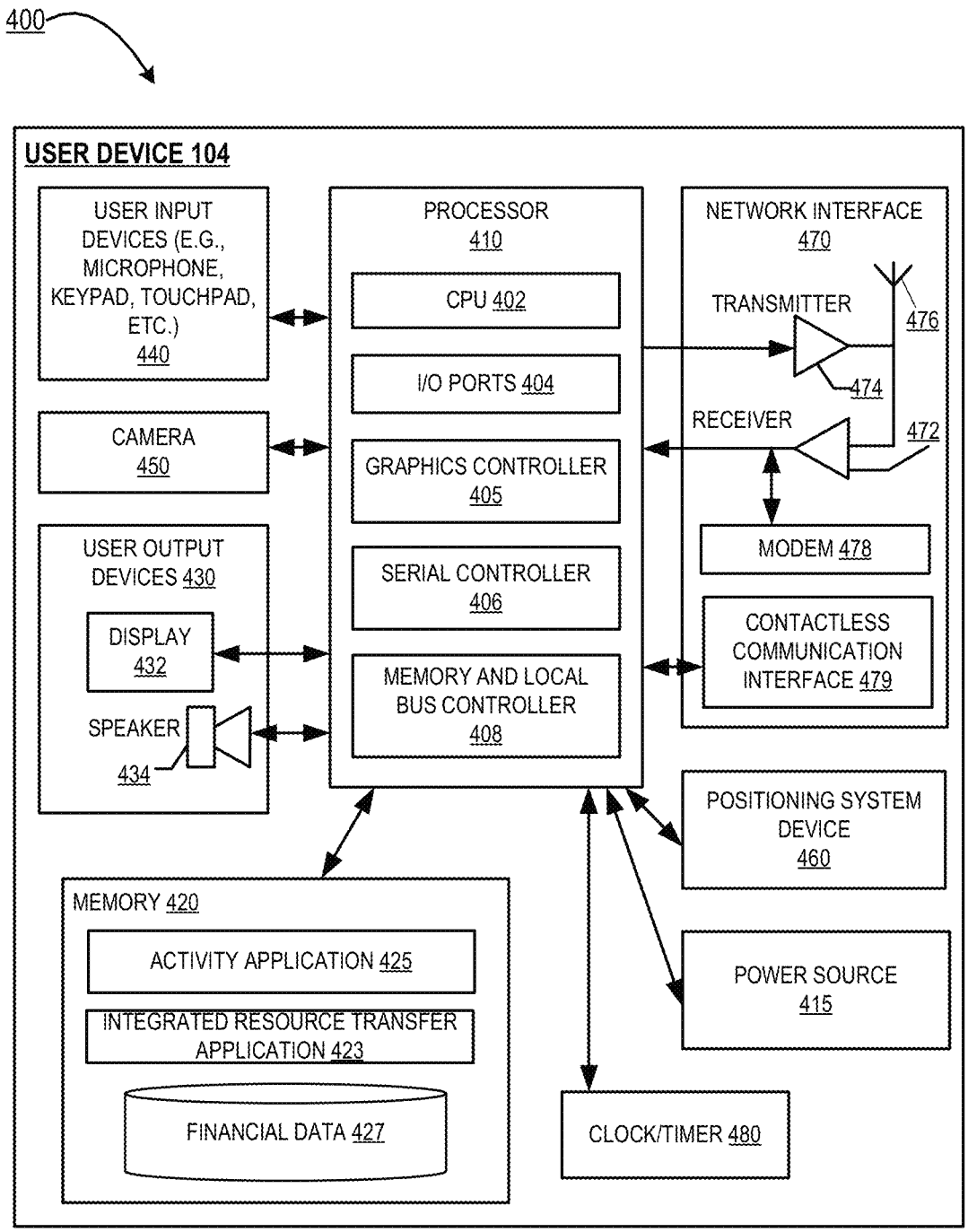
Figure 5A:
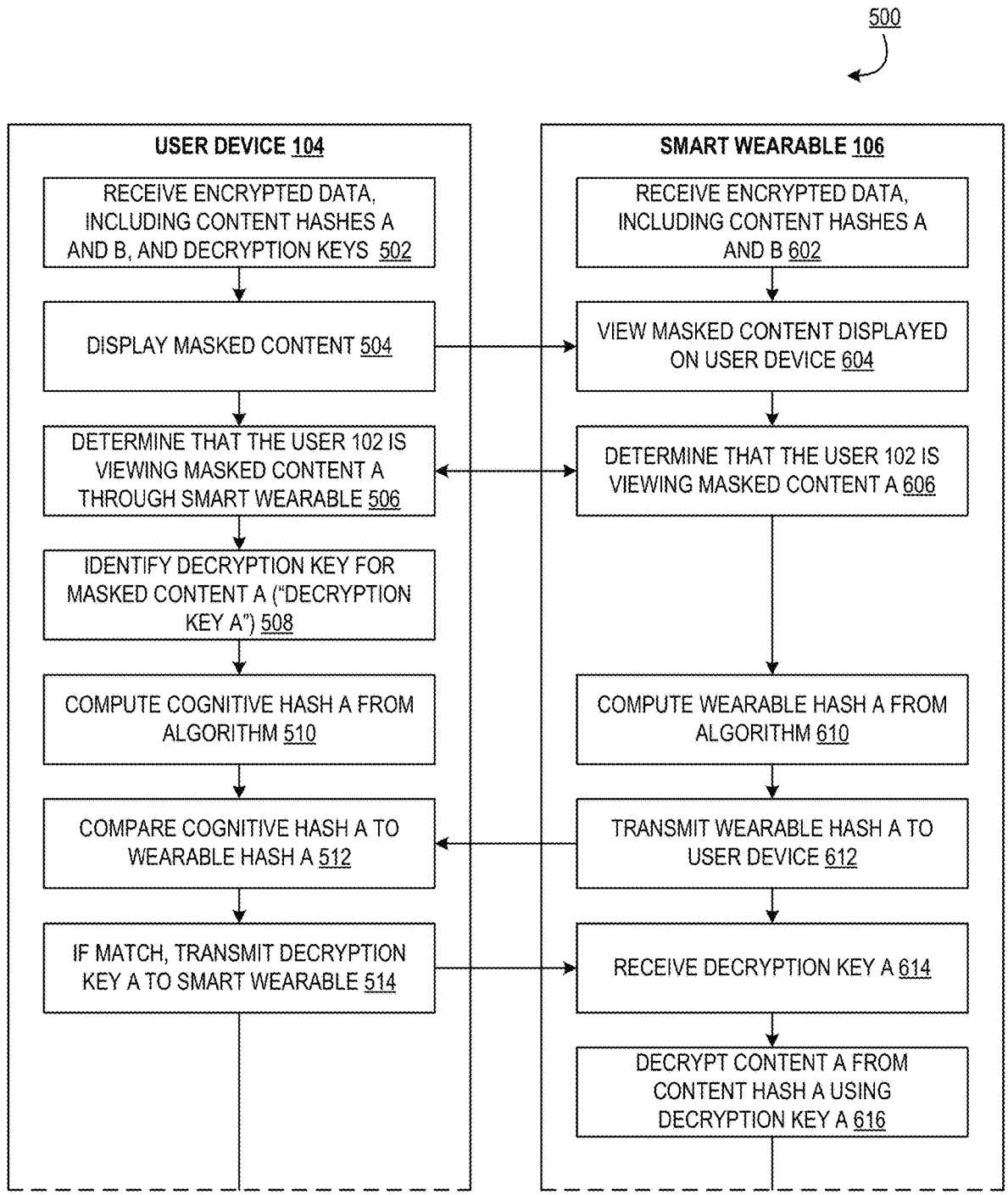
Figure 5B:
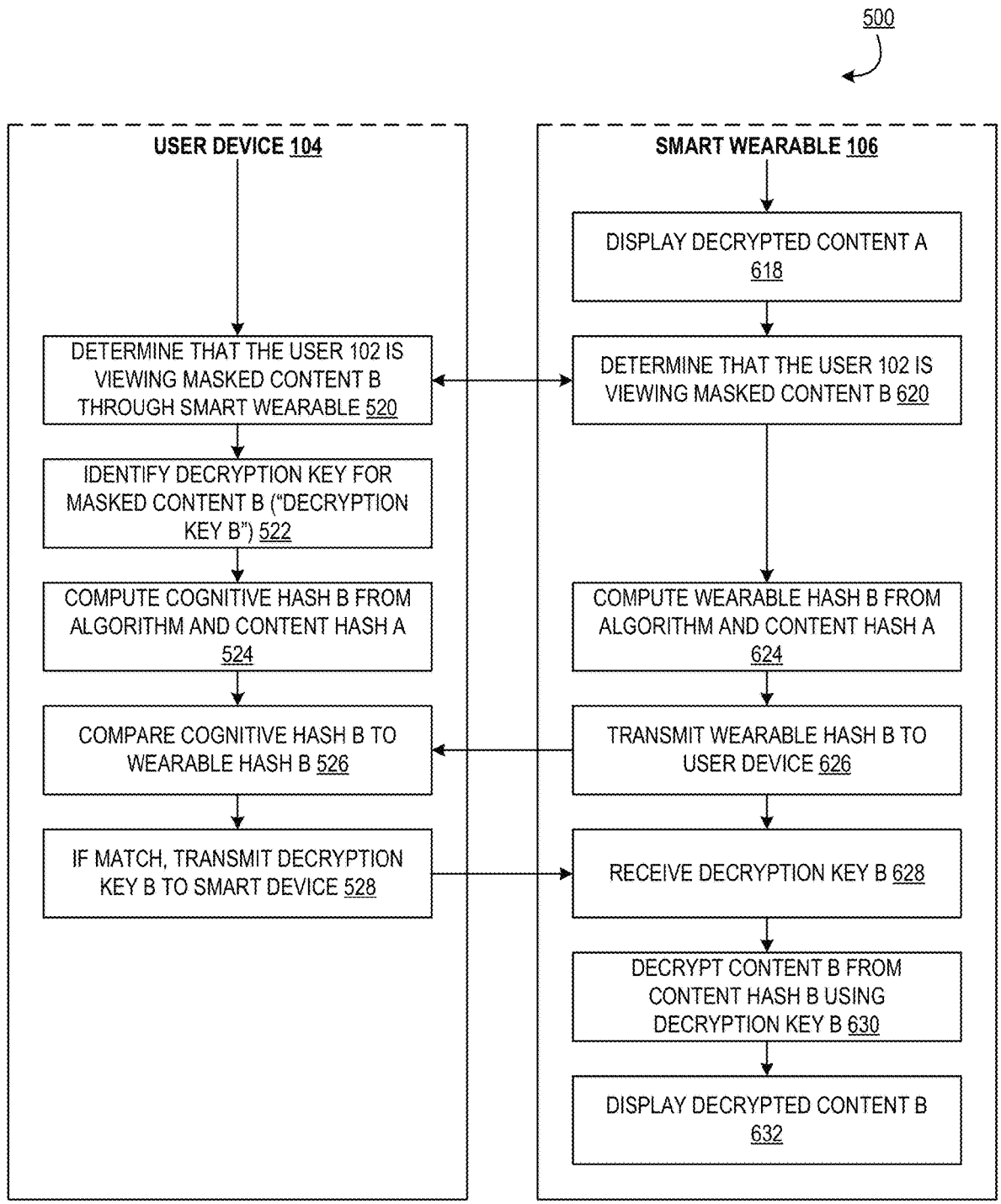
Figure 6:
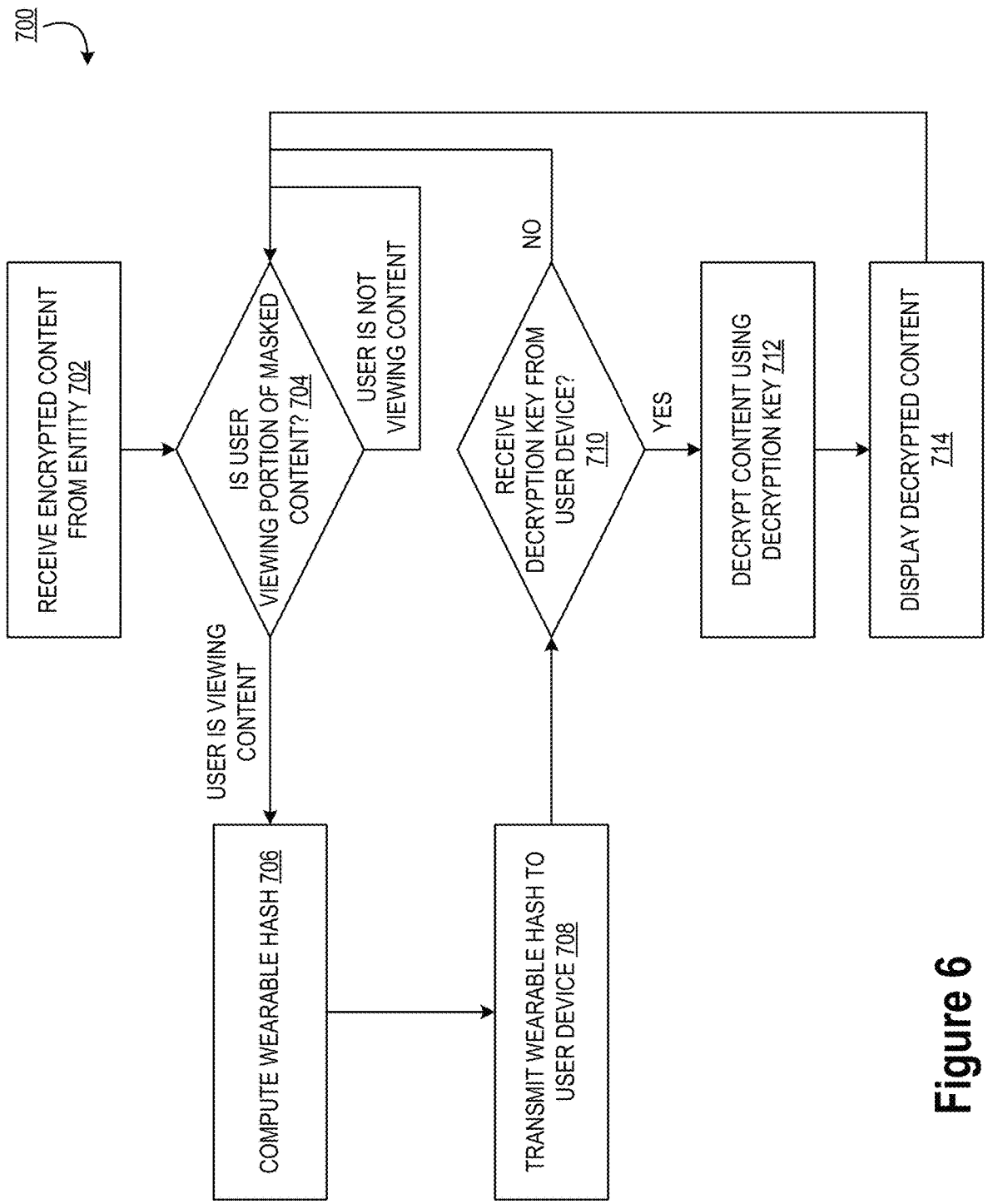
Figure 7:
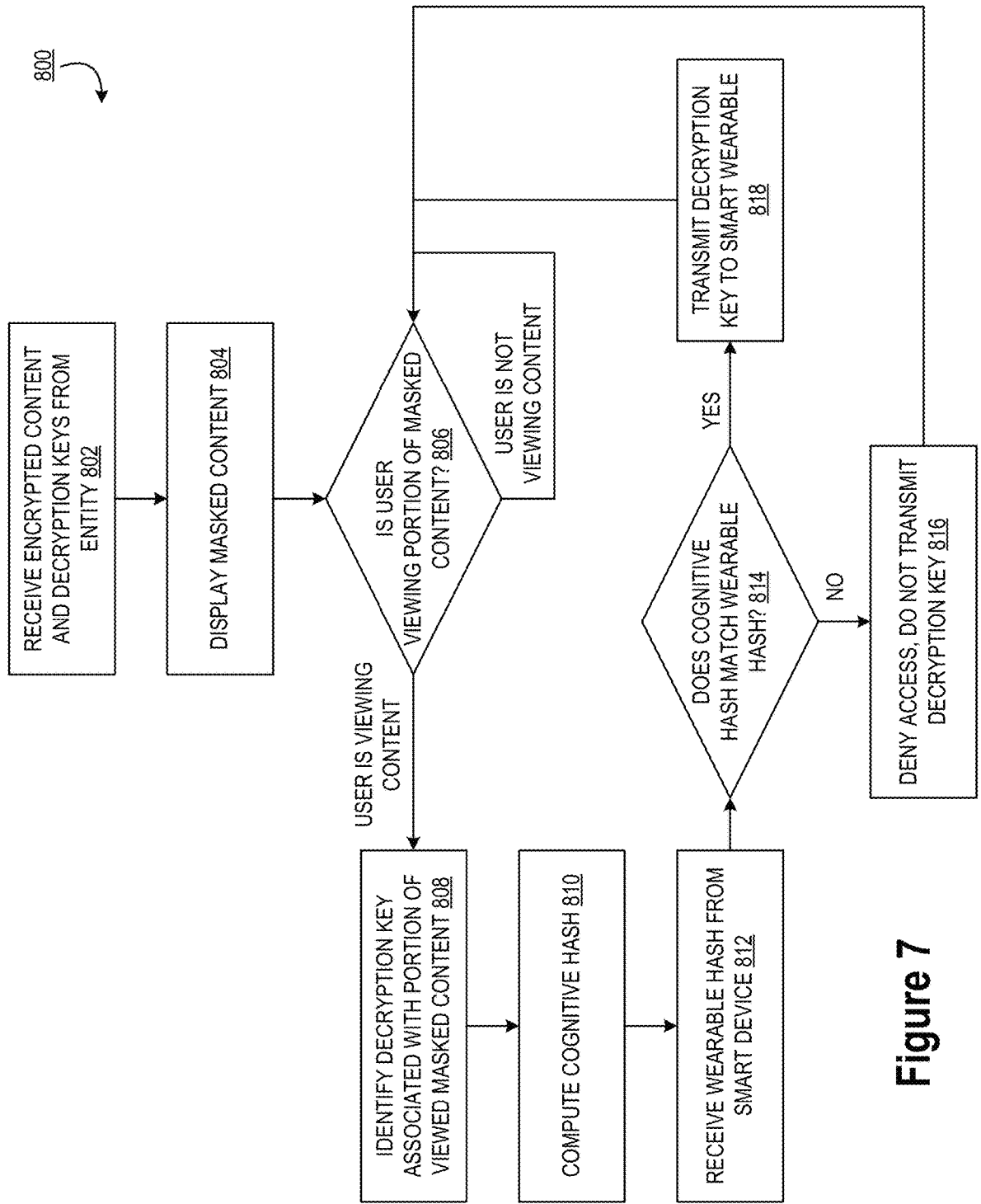
Figure 8:
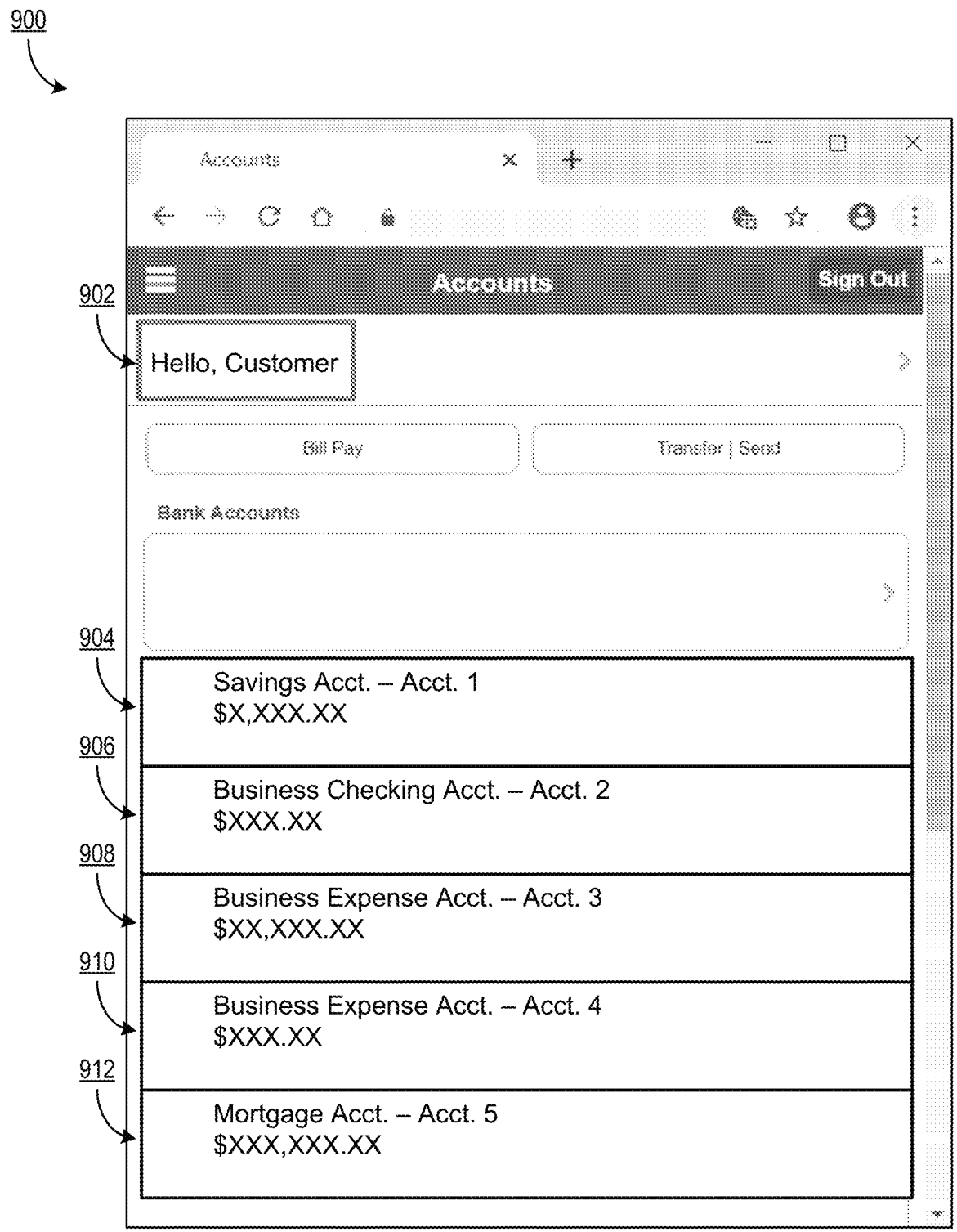
Figure 9:
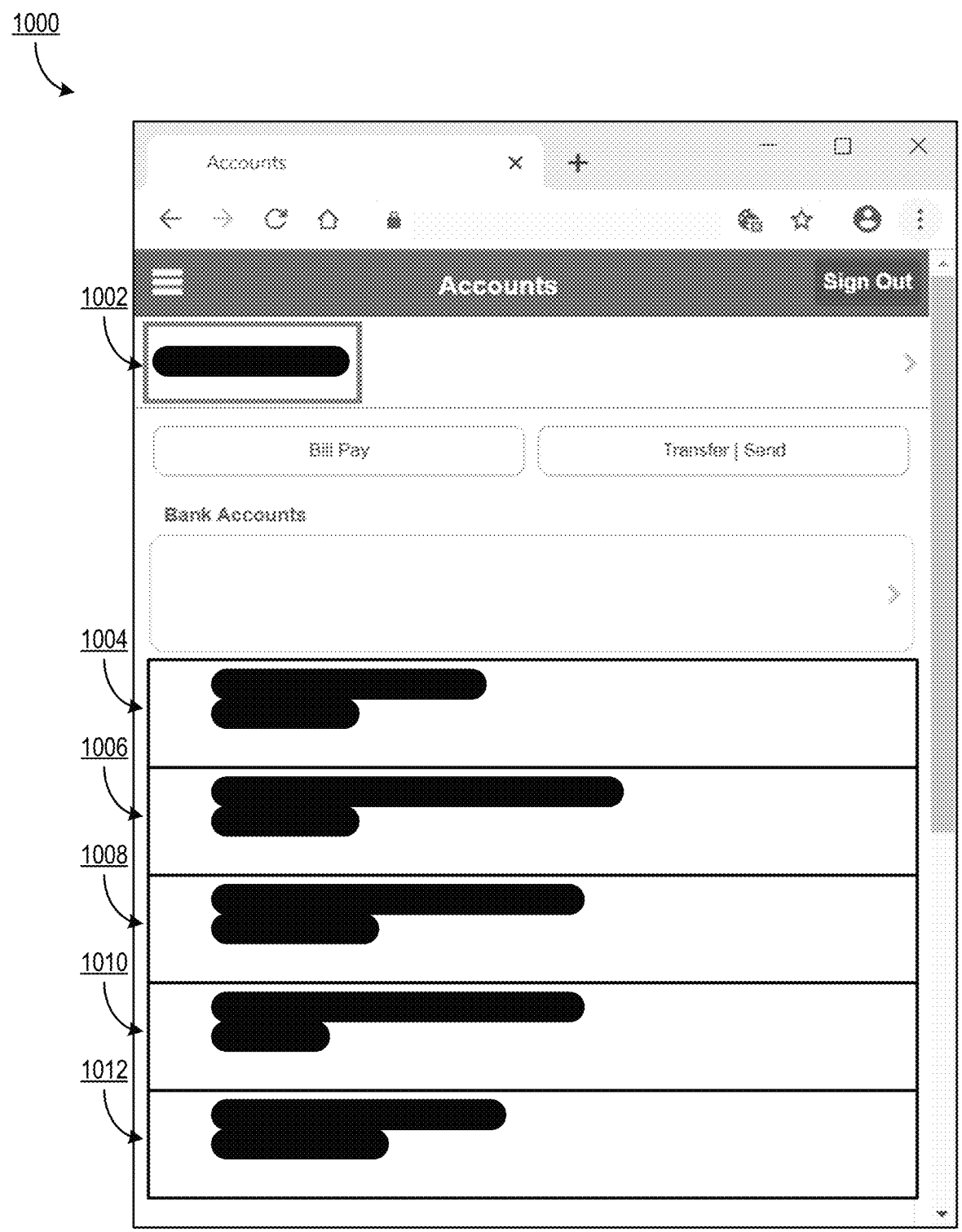
Figure 10:
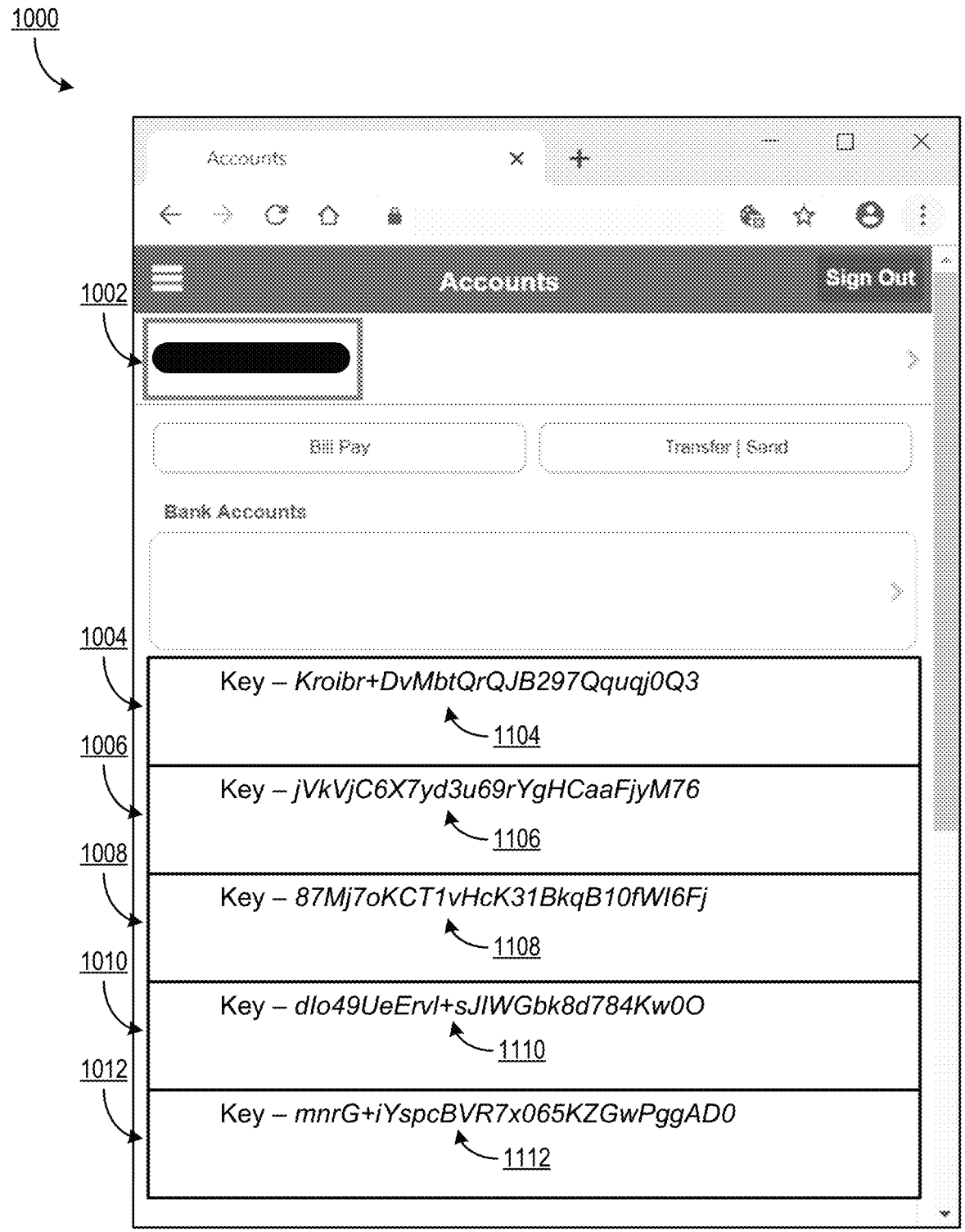
Figure 11:
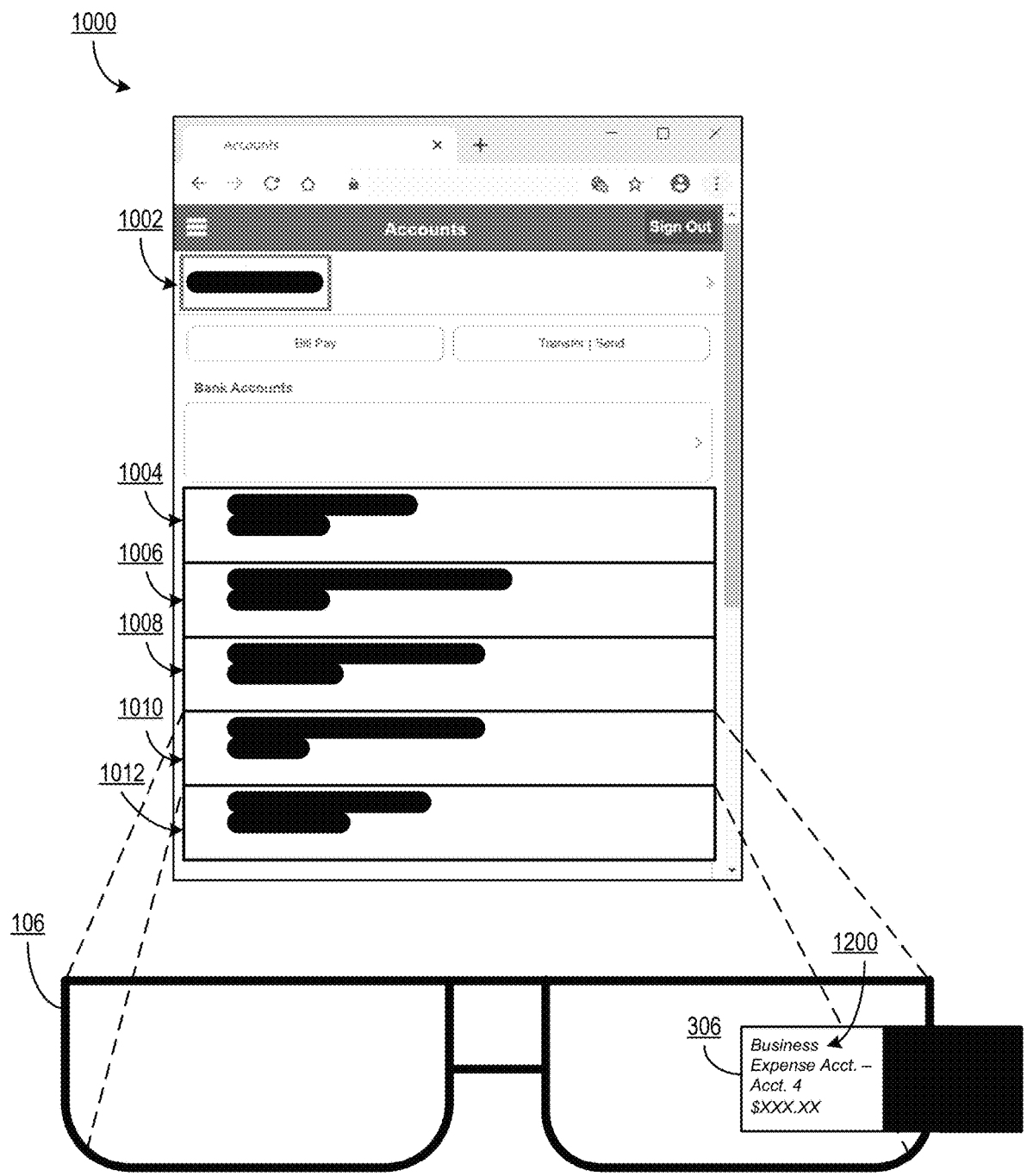

Having thus described embodiments of the invention in general terms, reference will now be made to the accompanying drawings, where:

FIG. 1 illustrates a block network architecture diagram illustrating a system environment 100 for continuous authentication and encryption for selective display of data between a user device and a smart wearable, in accordance with some embodiments of the invention;

FIG. 2 illustrates a block diagram 200 of an entity system, in accordance with some embodiments of the invention;

FIG. 3 illustrates a block diagram 300 of a smart wearable, in accordance with some embodiments of the invention;

FIG. 4 illustrates a block diagram 400 of a user device, in accordance with some embodiments of the invention;

FIGS. 5A and 5B illustrate a high-level process flow 500 for continuous authentication and encryption for selective display of data, in accordance with some embodiments of the invention;

FIG. 6 illustrates a high-level process flow 600 for continuous authentication and encryption for selective display of data from the perspective of a smart wearable, in accordance with some embodiments of the invention;

FIG. 7 illustrates a high-level process flow 700 for continuous authentication and encryption for selective display of data from the perspective of a user device, in accordance with some embodiments of the invention;

FIG. 8 illustrates a representation of a graphical user interface 900 for display on a user device, in accordance with some embodiments of the invention;

FIG. 9 illustrates another representation of a graphical user interface 1000 for display on a user device, in accordance with some embodiments of the invention;

FIG. 10 illustrates a representation of connections between the graphical user interface 1000 of FIG. 9 and decryption keys, in accordance with some embodiments of the invention; and FIG. 11 illustrates a representation of the graphical user interface 1000 of FIG. 9 being viewed by a smart wearable, in accordance with some embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution or establishment, associated with a network-connected management platform, such as a network-connected resource management platform or a network-connected electronic communication management platform. As such, the entity may be any institution, group, association, financial institution, merchant, establishment, company, union, authority, or the like.

As described herein, a "user" is an individual associated with an entity. As such, in some embodiments, the user may be an individual having past relationships, current relationships, or potential future relationships with an entity. In some instances, a "user" is an individual who has a relationship with the entity, such as a customer or a prospective customer. For example, in the instances where the entity is a resource entity or a merchant, financial institution, or the like, a user may be an individual or entity with one or more relationships, affiliations, or accounts with the entity (e.g., the merchant, the financial institution). In some instances, the user is an individual who seeks to utilize, operate, or perform one or more activities associated with a user device, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems described herein. In some instances, a user may be any individual or entity who has a relationship with a customer of the entity or financial institution. For purposes of this invention, the term "user" and "customer" may be used interchangeably.

A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, user information, or the like. The technology resource or account may be associated with and/or maintained by an entity, and may typically be associated with technology infrastructure such that the resource or account may be accessed, modified, or acted upon by the user electronically, for example using transaction terminals, user devices, merchant systems, and the like. In some embodiments, the entity may provide one or more technology instruments or financial instruments to the user for executing resource transfer activities or financial transactions. In some embodiments, the technology instruments/financial instruments, like electronic tokens, credit cards, debit cards, checks, loyalty cards, entity user device applications, account identifiers, routing numbers, passcodes and the like, may be associated with one or more resources or accounts of the user. As discussed, in some embodiments, the entity may represent a vendor or a merchant with whom the user engages in financial transactions (e.g., resource transfers like purchases, payments, returns, enrolling in merchant accounts and the like) or non-financial transactions (for resource transfers associated with loyalty programs and the like), either online or in physical stores or merchant locations.

As used herein, a "user interface" may be a graphical user interface that facilitates communication using one or more communication mediums, such as tactile communication (e.g., communication via a touch screen, keyboard, and the like), audio communication, textual communication, and/or video communication (e.g., gestures detected by a camera). In various embodiments, a graphical user interface (GUI) of the present invention may be a type of interface that allows users to interact with electronic elements/devices, such as graphical widgets, graphical icons, and visual indicators (e.g., secondary notation), as opposed to using only text via the command line. That said, the graphical user interfaces may be configured for audio, visual, and/or textual communication, and may be configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface may be configured to be presented on one or more display devices associated with user devices, entity systems, auxiliary user devices, processing systems, and the like.

An electronic activity, also referred to as a "technology activity" or a "user activity," such as a "resource transfer" or "transaction," may refer to any activities or communications between a user or entity and a financial institution, between the user and the entity, activities or communication between multiple entities, communication between technology applications, and the like. A resource transfer may refer to a payment, a processing of funds, a purchase of goods or services, a return of goods or services, a payment transaction, a credit transaction, or other interactions involving a user's resource or account. In the context of a financial institution or a resource entity such as a merchant, a resource transfer may refer to one or more of: a transfer of resources/funds between financial accounts (also referred to as "resources"), a deposit of resources/funds into a financial account or resource (e.g., depositing a check), a withdrawal of resources or funds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments (e.g., paying monthly bills and the like); loading money onto stored value cards (SVCs) and/or prepaid cards; donating to charities; and/or the like. Unless specifically limited by the context, a "resource transfer," a "transaction," a "transaction event," or a "point of transaction event" may refer to any user activity (financial or non-financial activity) initiated between a user and a resource entity (such as a merchant), between the user and a financial institution, or any combination thereof.

In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between accounts; a funds/resource transfer as a payment for the purchase for a product, service, or the like from a merchant; and the like. Typical financial transactions or resource transfers may include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, etc. When discussing that resource transfers or transactions are evaluated, it could mean that the transaction has already occurred, is in the process of occurring or being processed, or has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "electronic communication" may refer to a communication associated with a user, typically received, viewed, and/or transmitted via a communication channel. In some embodiments, electronic communications may be associated with user communications (e.g., non-financial communications) relating to user travel, user appointments, etc. In some embodiments, electronic communications may be associated with user communications (e.g., financial communications) relating to user financial statements (e.g., savings statements, shareholder notices, etc.), bill payments, account notifications, communications requiring actions to be performed by the user, communications triggering resource/account activities, documents to be signed by the user, etc. In some embodiments, communication channels may comprise cellular, audio, email, cellular messaging, website, mobile application notifications, and the like.

Using current systems and methods, a user may use a personal user device to view electronic communications, such as a status of an account and/or resources that the user holds with an entity; personal information relating to the user; messages, including email messages and text messages; graphical user interfaces displayed or otherwise provided to the user by the user device, where the user device is in communication with the entity; and the like. These electronic communications may include sensitive or secure information that the user would not want a third party, such as an onlooker, to see. For example, if the electronic communication includes the status of an account that the user holds with an entity, the user may not want a third party to view a name of the account, the identity of the entity, personal information of the user displayed in connection with the account, an amount of resources that the user maintains in the account, and so on. Additionally, in some cases, the user may not want a third party to see any part of the electronic communications being displayed on the user device.

However, in various situations, user devices may be viewable by individuals other than the user, even though such viewing by third parties may be unwanted by the user. As an illustration, an onlooker who is seated next to the user or standing behind the user may be able to view what is being shown on a display of the user device. If what is being displayed includes sensitive or secure information, the onlooker may be able to view this sensitive or secure information.

Accordingly, embodiments of present disclosure are directed to a system configured to provide continuous authentication and encryption for selective display of data. More specifically, in various embodiments described herein, a user device may receive encrypted content from an entity. However, rather than simply decrypting and displaying the content, the user device may display a masked version of the content. For example, the user device may mark over or omit certain areas of content fields or all areas of content fields that include words and/or characters. As such, no one directly viewing the user device, including a third party, can see the content that the user device received from the entity.

Instead, the user may use a smart wearable device to view the masked content on the user device, and the smart wearable device may display to the user an unmasked version of the content that the user is attempting to view on the user device. For instance, in some embodiments, the user may view the masked version of the content that is displayed on the user device through a pair of smart glasses that is paired (e.g., via a Bluetooth® connection, via a near-field communication (NFC) connection, via a radio-frequency identification (RFID) connection) with the user device. The smart glasses may include a display, but the display may be too small to display all of the unmasked version of the content to the user. Instead, the user device and/or the smart glasses, either individually or by exchanging data, may identify which portion of the masked content that the user is attempting to view through the smart glasses. The smart glasses may then display an unmasked version of the viewed content portion to the user on the display of the smart glasses. In this way, the user may view the electronic communications received from the entity without a third-party onlooker being able to see them as well.

Nevertheless, in some cases, a third party may also attempt to use a smart wearable device to view the masked version of the content that is displayed on the user device, as well as intercept and display the unmasked version of the viewed content. Referring to the previous example, for instance, a third party may attempt to wear a pair of smart glasses and use them to view the masked version of content on the user device. In such cases, it would be technically advantageous for the system to use a process of continuously authenticating the smart wearable device, thereby helping to ensure that only a smart wearable device being used by the user decrypts and displays the unmasked version of the content.

As such, once the user device and/or the smart wearable determines which portion of masked content the user is attempting the view, the user device and the smart wearable device may each compute an authentication hash. In embodiments described herein, the authentication hash computed by the user device may be referred to as the "cognitive hash," and the authentication hash computed by the smart wearable device may be referred to as the "wearable hash." To further authenticate the smart wearable device, the input to the authentication hash may be or include a hash of the previous content that the user viewed.

For example, the user device and the smart wearable may each receive encrypted content from the entity as content hashes. However, only the user device may receive and/or compute decryption keys that can be used to decrypt the encrypted content. The user device may then display masked versions of the content in a variety of content fields, where each content field corresponds to a content hash. Once a content field that the user is attempting to view is identified, the user device and the smart wearable device may identify which content hash the content field corresponds to (e.g., content hash X), and the user device and smart wearable device may compute the cognitive and wearable hashes, respectively. This may include identifying the content hash from the content field that the user immediately previously viewed (e.g., content hash (X−1)) and inputting the content hash from the content field that the user immediately previously viewed into a hash algorithm. The same hash algorithm may be used by both the user device and the smart wearable such that, if the user device and the smart wearable both identify the previous content hash correctly, the user device and the smart wearable should both produce the same hash as the cognitive hash and the wearable hash, respectively. As such, the user device may compare the cognitive hash and the wearable hash and transmit the decryption key to the user device only if the cognitive hash and the wearable hash match. Because only a smart wearable device that was previously in communication with the user device, and thus previously authenticated by the user device, should be able to identify the previous content hash, in this way the user device may continuously authenticate the smart wearable device.

Referring to FIG. 1, a block diagram illustrating a system environment 100 configured for continuous authentication and encryption for selective display of data is illustrated, in accordance with some embodiments of the invention. As illustrated, the system environment 100 includes a user device 104 and a smart wearable 106 that are associated with a user 102. The system environment 100 also includes an entity system 108 in operative communication with the user device 104 and the smart wearable 106. As such, the user device 104 and the smart wearable 106 are configured to receive data, such as encrypted data and/or decryption keys for encrypted data, from the entity system 108.

Typically, the user device 104 and the smart wearable 106 are in electronic communication with the entity system 108, via the network 101, which may be the internet, an intranet, or the like. The network 101 is configured to establish an operative connection between otherwise incompatible devices, for example establishing a communication channel, automatically and in real time, between the user device 104, the smart wearable 106, and the entity system 108 (e.g., in the instances where communication channels are established between the user device 104 and/or the smart wearable 106 and the entity system 108). In this regard, the wireless communication channel may further comprise near field communication (NFC), communication via radio waves, communication through the internet, communication via electromagnetic waves, and the like. In FIG. 1, the network 101 may include a local area network (LAN), a wide area network (WAN), a global area network (GAN), and/or a near field communication (NFC) network. Accordingly, the network 101 may provide for wireline, wireless, or a combination of wireline and wireless communication between devices in the network 101.

Additionally, the user device 104 and the smart wearable 106 are operatively coupled to each other via a user device-smart wearable network 110. Accordingly, the user device 104 and the smart wearable 106 are configured to electronically communicate directly with each other, separately from the electronic communication with the entity system 108, such as for the transmittal of data. The user device-smart wearable network 110 is configured to establish an operative connection between otherwise incompatible devices, for example establishing a communication channel, automatically and in real time, between the user device 104 and the smart wearable 106 (e.g., in the instances where a communication channel is established between the user device 104 and the smart wearable 106). In this regard, the wireless communication channel may further comprise communication near field communication (NFC), communication via radio waves, communication through the internet, communication via electromagnetic waves, and the like. In FIG. 1, similar to the network 101, the user device-smart wearable network 110 may include a local area network (LAN), a wide area network (WAN), and/or a global area network (GAN). The user device-smart wearable network 110 may further include communications via radio waves, such as communication via a Bluetooth® network, communication via a radio-frequency identification (RFID) network, and/or communication via a near field communication (NFC) network. As such, the user device-smart wearable network 110 may provide for wireline, wireless, or a combination of wireline and wireless communication between devices in the network.

In some embodiments, the user device-smart wearable network 110 is the same as the network 101. In other embodiments, the user device-smart wearable network 110 is separate from the network 101. For example, the network 101 may be a wide-area network (WAN) to which each of the user device 104, smart wearable 106, and entity system 108 separately connect, and the network 110 may be a communication channel established directly between the user device 104 and the smart wearable 106.

The entity system 108 is associated with the entity and configured to store information relating to the relationship the user 102 has with the entity. For example, if the user 102 has a relationship with the entity based on an account or an amount of resources the user 102 maintains with the entity, the entity system 108 may store information about the user 102 and information about the resources. Additionally, the entity system 108 is configured to transmit encrypted data relating to the user's relationship with the entity to the user device 104 and to the smart wearable 106. As an illustration, the entity system 108 may transmit encrypted data relating to the status of one or more accounts and/or resources the user 102 maintains with the entity (e.g., a usable amount of the resources, an amount of resources pending for transfer). In some embodiments, the entity system 108 may further communicate with the user device 104 regarding how information is displayed to the user 102 on the user device 104, for example by transmitting all or part of graphical user interfaces that are displayed to the user 102. These graphical user interfaces may include information relating to the user 102 and/or to resources maintained by the user 102 with the entity, and portions of this information may be masked out in the graphical user interfaces as described in further detail below. The components of the entity system 108, its features, and its functions will be described in further detail below and with respect to FIG. 2, in particular.

The smart wearable 106 is a device configured to be worn by the user and remain in operative communication (e.g., with the user device 104 and the entity system 108), as well as maintain the ability to provide computative analyses, while worn. In some embodiments, the smart wearable 106 may be smart glasses, though the smart wearable 106 may also be a smart watch, smart jewelry, a smart fitness and activity monitor, a smart device implanted in the user's body, and the like. The smart wearable 106 is configured to connect to both the network 101 and the user device-smart wearable network 110, as well as receive and transmit information over the networks 101 and 110. For example, the smart wearable 106 may receive information from the entity system 108, such as encrypted data, and transmit information, such as hashes, to the user device 104 as part of a continuous authentication and encryption process. The components of the smart wearable 106, its features, and its functions will be described in further detail below and with respect to FIG. 3, in particular.

The user device 104 may comprise a mobile communication device, such as a cellular telecommunications device (e.g., a smart phone or mobile phone), a computing device such as a laptop computer, a personal digital assistant (PDA), a mobile internet accessing device, or other mobile device including, but not limited to pagers, mobile televisions, cameras, video recorders, audio/video players, radios, global positioning system (GPS) devices, any combination of the aforementioned, or the like. The user device 104 is configured to connect to both the network 101 and the user device-smart wearable network 110, as well as receive and transmit information over the networks 101 and 110. As an illustration, the user device 104 may receive information from the entity system 108, such as encrypted data, decryption keys, and graphical user interfaces, and transmit information, such as decryption keys, to the smart wearable 106 as part of a continuous authentication and encryption process. The components of the user device 104, its features, and its functions will be described in further detail below and with respect to FIG. 4, in particular.

FIG. 2 illustrates a block diagram 200 of the entity system 108, in accordance with some embodiments of the invention. As illustrated in FIG. 2, the entity system 108 may include a communication device 201; a processing device 202; and a memory device 204 having an authentication application/module 208, a processing application 210, and a processing datastore 212 stored therein. As shown, the processing device 202 is operatively connected to and configured to control and cause the communication device 201 and the memory device 204 to perform one or more functions. In some embodiments, the authentication application 208 and/or processing application 210 comprises computer-readable instructions or code that when executed by the processing device 202 cause the processing device 202 to perform one or more functions. For example, the authentication application 208 and/or processing application 210 may include a computer-readable program code including one or more executable portions. It will be understood that the authentication application 208 and/or the processing application 210 may be executable to initiate, perform, complete, and/or facilitate one or more portions of any embodiments described and/or contemplated herein.

The communication device 201 may generally include a modem, server, transceiver, and/or other devices for communicating with other devices on the network 101. In some embodiments, the communication device 201 may be a communication interface having one or more communication devices configured to communicate with one or more devices on the network 101, such as the user device 104 and the smart wearable 106. The communicative connection to the one or more devices on the network 101 may be via a wired or wireless connection. In this regard, the wireless communication channel may comprise near field communication (NFC), communication via radio waves, communication through the internet, communication via electromagnetic waves, communication via applicable cellular systems of wireless telephone networks, and the like.

Additionally, referring to the entity system 108 illustrated in FIG. 2, the processing device 202 may generally refer to a device or combination of devices having circuitry used for implementing the communication and/or logic functions of the processing device 202. For example, the processing device 202 may include a control unit; a digital signal processor device; a microprocessor device; and various analog-to-digital converters, digital-to-analog converters, and other support circuits and/or combinations of the foregoing. Control and signal processing of the entity system 108 may be allocated between these processing devices according to their respective capabilities. The processing device 202 may further include functionality to operate one or more software programs based on computer-readable instructions 206 thereof, which may be stored in the memory device 204, such as the authentication application 208 and the processing application 210.

As the phrase is used herein, a processing device may be "configured to" perform a certain function in a variety of ways, including, for example, by having one or more general-purpose circuits perform the function by executing particular computer-executable program code embodied in a computer-readable medium and/or by having one or more application-specific circuits perform the function. The processing device 202 may be configured to use the network communication interface of the communication device 201 to transmit and/or receive data and/or commands to and/or from the other devices/systems connected to the network 101.

The memory device 204 within the entity system 108 may generally refer to a device or combination of devices that store one or more forms of computer-readable media for storing data and/or computer-executable program code/instructions. For example, the memory device 204 may include any computer memory that provides an actual or virtual space to temporarily or permanently store data and/or commands provided to the processing device 202 when it carries out the functions described herein.

The entity system 108 may further include a user data repository 214 comprising user authentication data 216 and user account data 218. The processing device 202 may utilize the authentication data 216 to validate user authentication credentials. The account data 218 may reflect the current account data of the user 102 (e.g., names of one or more accounts that the user 102 holds with the entity, balances in one or more accounts that the user 102 holds with the entity, and the like).

In some embodiments, the authentication application 208 may comprise computer-readable instructions associated with one or more authentication steps of user activities, or the computer-readable instructions associated with one or more authentication steps of user activities may be stored in the processing datastore 212. The authentication application 208 may be embodied within the processing application 210, in some instances. In some embodiments, the authentication application 208 comprises computer-readable instructions that, when executed by the processing device 202, cause the processing device 202 to perform one or more functions and/or transmit control instructions to other components or devices to perform one or more authentication steps described herein. These authentication steps may include requesting authentication credentials from the user 102 via the user device 104. For example, the user 102 may send a request to the entity system 108 from the user device 104 to access a website or secure portion of an application, for example relating to resources and/or an account held by the user 102 with the entity. In response, the authentication application 208 may request authentication credentials from the user 102 (e.g., a username, a password, a biometric, and/or the like). Based on authentication credentials input by the user 102 and received from the user device 104, the authentication application 208 may authenticate the user 102, such as by comparing the authentication credentials to template credentials stored for the user 102 in the user authentication data 216 of the user data repository 214. If the received authentication credentials match the template credentials, the authentication application 208 may authenticate the user 102. Otherwise, if the received authentication credentials do not match the template credentials, the authentication application 208 may deny access to the user 102.

In some embodiments, the processing application 210 may comprise computer-readable instructions associated with transmitting one or more data sets to the user device 104 and/or the smart wearable 106, or the computer-readable instructions associated with transmitting one or more data sets to the user device 104 and/or the smart wearable 106 may be stored in the processing datastore 212. In some embodiments, the processing application 210 comprises computer-readable instructions that, when executed by the processing device 202, cause the processing device 202 to perform one or more functions and/or transmit control instructions to other components or devices to perform one or more transmittal steps described herein. These transmittal steps may include encrypting data, such as data relating to the user's accounts from the user account data 218 in the user data repository 214, and transmitting the encrypted data. For example, the processing application 210 may transmit hashes of content (e.g., personal information of the user 102, account names, account balances, account statuses, and the like) to the user device 104 and/or the smart wearable 106. In some instances, these transmittal steps may also include transmitting decryption keys for the content hashes to the user device 104. In some embodiments, at least part of the content transmitted to the user device 104 may be in the form of graphical user interfaces configured for display to the user 102 by the user device 104.

FIG. 3 illustrates a block diagram 300 of the smart wearable 106, in accordance with some embodiments of the invention. For example, in some instances, the block diagram 300 may represent a pair of smart glasses. A smart wearable 106 may generally include a processing device or processor 312 communicably coupled to devices of the smart wearable 106, such as a memory device 308; user output devices 304 (e.g., a user display device 306); user input devices 301 (e.g., a microphone, touchpad, and the like); a communication device or network interface device 320; a power source 332; a clock or other timer 334; a visual capture device, such as a camera 302; and the like. The processor 312 may further include a central processing unit (CPU) 314, a graphics controller 316, and a memory and local bus controller 318.

The processor 312 may include functionality to operate one or more software programs or applications, which may be stored in the memory device 308. For example, the processor 312 may be cable of operating applications such as a content viewing application 310 or a web browser application. The operated application may then allow the smart wearable 106 to transmit and receive data and instructions from the entity system 108 (e.g., via wireless communication); data from the user device 104; web content, such as, for example, location-based content and/or other web page content, according to a Wireless Application Protocol (WAP), Hypertext Transfer Protocol (HTTP); and/or the like.

In various embodiments, the content viewing application 310 allows the smart wearable 106 to receive data from the entity system 108. The data may include secure or sensitive content that is encrypted and is also transmitted to the user device 104, as described in further detail below. As an illustration, the data may include secure or sensitive content regarding the personal identification of the user 102 (e.g., the user's name, the user's birthday, the user's address, and the like) and/or secure content regarding information relating to the names of the user's accounts, the amount of resources the user holds with the entity, and the like. The secure content may be transmitted to the smart wearable 106 in an encrypted form, for example as a hash. Additionally, the decryption keys needed to fully decrypt the secure content may not be transmitted to the smart wearable 106 by the entity system 108. For example, in some embodiments, the smart wearable 106 may use a private key associated with the smart wearable 106 to partially decrypt a hash transmitted by the entity system 108 and encrypted with the corresponding public key of the smart wearable 106. However, the smart wearable 106 may need a decryption key transmitted from the user device 104 to fully decrypt the hash, as described in further detail below. In other embodiments, the smart wearable 106 may need a decryption key transmitted from the user device 104 to perform any decryption of the hash.

Additionally, as described in further detail below, the user device 104 may display content that is masked such that it is unreadable to an individual viewing the user device 104. Thus, in some embodiments, the content viewing application 310 is configured to track cognitive data that can be used in determining a portion of masked content displayed on the user device 104 that the user 102 is attempting to view. The content viewing application 310 may use one or more devices of the smart wearable 106 in tracking this cognitive data. For example, the content viewing application 310 may use an outwardly facing camera 302 (e.g., facing away from the user 102) to track the location of the smart wearable 106 with respect to the user device 104, an inwardly facing camera 302 (e.g., facing toward the user 102) to track the user's eye movement, an accelerometer to track the orientation of the smart wearable 106, and/or the like. In some embodiments, the content viewing application 310 may transmit this cognitive data to the user device 104. Further, in some embodiments, the content viewing application 310 may make a preliminary or final determination of the portion of masked content that the user 102 is attempting to view on the user device 104, and the smart wearable 106 may transmit this preliminary or final determination to the user device 104.

In various embodiments, the content viewing application 310 further allows the smart wearable 106 to generate a wearable hash that is used in a process for continuous authentication and encryption for selective display of data, as described in further detail below with respect to FIGS. 5A, 5B, and 6. In addition, the content viewing application 310 allows the smart wearable 106 to transmit the wearable hash to the user device 104 and, if the user 102 is authenticated as discussed in further detail below, receive a decryption key for the portion of masked content that the user 102 has been determined to be attempting to view. Moreover, the content viewing application 310 allows the smart wearable 106 to decrypt, using the received decryption key, the portion of encrypted content that corresponds to the portion of masked content the user is attempting to view and display the unencrypted content on the display 306. For example, if the smart wearable 106 is smart glasses, the smart glasses may display the decrypted content on a side liquid crystal display (LCD) screen that is overlaid over a portion of the user's sightline.

The processor 312 may be configured to use the network interface device 320 to communicate with one or more devices on the network 101 and the user device-smart wearable network 110, such as, but not limited to the entity system 108 (e.g., via the network 101) and the user device 104 (e.g., via the network 110). In this regard, the network interface device 320 may include an antenna 326 operatively coupled to a transmitter 324 and a receiver 322 (together a "transceiver"), a modem 328, and a contactless communication interface 330. The processor 312 may be configured to provide signals to and receive signals from the transmitter 324 and receiver 322, respectively. The signals may include signaling information in accordance with the air interface standard of the applicable Bluetooth® Low Energy (BLE) standard, cellular system of the wireless telephone network, and the like, that may be part of the network 101 and/or network 110. In this regard, the user device 104 may be configured to operate with one or more air interface standards, communication protocols, modulation types, and access types.

By way of illustration, the smart wearable 106 may be configured to operate in accordance with any of a number of first, second, third, fourth, and/or fifth-generation communication protocols and/or the like. For example, the smart wearable 106 may be configured to operate in accordance with second-generation (2G) wireless communication protocols IS-136 (time division multiple access (TDMA)), GSM (global system for mobile communication), and/or IS-95 (code division multiple access (CDMA)); with third-generation (3G) wireless communication protocols, such as Universal Mobile Telecommunications System (UMTS), CDMA2000, wideband CDMA (WCDMA) and/or time division-synchronous CDMA (TD-SCDMA); with fourth-generation (4G) wireless communication protocols; with fifth-generation (5G) wireless communication protocols; and/or the like.

The smart wearable 106 may also be configured to operate in accordance with non-cellular communication mechanisms, such as via a wireless local area network (WLAN) or other communication/data networks. The smart wearable 106 may further be configured to operate in BLE, radio frequency (e.g., NFC, RFID), audio frequency, ultrasound frequency, or other communication/data networks.

As described above, the smart wearable 106 includes user interface that include user output devices 304 and/or user input devices 301. The user output devices 304 may include a display 306 (e.g., a liquid crystal display (LCD)), a bone conduction transducer, and the like, which are operatively coupled to the processor 312. The user input devices 301 may include any of a number of devices allowing the smart wearable 106 to receive data from a user 102, such as a touchpad, microphone, and/or other input device(s).

The smart wearable 106 may further include a power source 332. Generally, the power source 332 may be a device that supplies electrical energy to an electrical load. In some embodiments, the power source 332 may convert a form of energy such as solar energy, chemical energy, mechanical energy, and the like, to electrical energy. The power source 332 may be a may be a battery, such as a lithium battery, a nickel-metal hydride battery, or the like, that is used for powering various circuits, for example the transceiver circuit and other devices that are used to operate the smart wearable 106. Alternatively, the power source 332 may be a power adapter that can connect a power supply from a power outlet to the smart wearable 106. In such embodiments, a power adapter may be classified as a power source "in" the smart wearable 106.

The smart wearable 106 may also include a memory bugger, cache memory, or temporary memory device operatively coupled to the processor 312. Typically, one or more applications (e.g., application 310) are loaded into the temporary memory during use. As used herein, memory may include any computer-readable medium configured to store data, code, or other information. For example, the memory may store computer-readable program code including one or more executable portions. The memory device 308 may include volatile memory, such as volatile Random Access Memory (RAM) including a cache area for the temporary storage of data. The memory device 308 may also include non-volatile memory, which can be embedded and/or may be removable. The non-volatile memory may additionally or alternatively include an electrically erasable programmable read-only memory (EEPROM), flash memory or the like.

FIG. 4 illustrates a block diagram 400 of the user device 104, such as a smartphone or laptop computer, in accordance with some embodiments of the invention. A user device 104 may generally include a processing device or processor 410 communicably coupled to devices of the user device 104, such as a memory device 420; user output devices 430 (e.g., a user display device 432 and/or a speaker 434); user input devices 440 (e.g., a microphone, keypad, touchpad, touch screen, and the like); a communication device or network interface device 470; a power source 415; a clock or other timer 480; a visual capture device, such as a camera 450; a positioning system device 460, such as a geo-positioning system device (e.g., a GPS device, an accelerometer, and the like); one or more chips; and the like. The processor 410 may further include a central processing unit (CPU) 402, input/output (I/O) port controllers 404, a graphics controller 405, a serial bus controller 406, and a memory and local bus controller 408.

The processor 410 may include functionality to operate one or more software programs or applications, which may be stored in the memory device 420. For example, the processor 410 may be capable of operating applications such as an activity application 425, an integrated resource transfer application 423, or a web browser application. The activity application 425, for example, may then allow the user device 104 to transmit and receive data and instructions from the entity system 108 (e.g., via wireless communication); transmit and receive data from the smart wearable 106; web content, such as, for example, location-based content and/or other web page content, according to a Wireless Application Protocol (WAP), Hypertext Transfer Protocol (HTTP); and/or the like.

In various embodiments, the activity application 425 allows the user device 104 to receive data from the entity system 108. The data may include secure and/or non-secure content regarding, for example, an account and/or resources that the user 102 holds with the entity. As an illustration, the data may include secure or sensitive content regarding the personal identification of the user 102 (e.g., the user's name, the user's birthday, the user's address) and/or secure content regarding information relating to the names of the user's accounts, the amount of resources the user holds with the entity, and the like. The data may also include non-secure content, such as formatting for a graphical user interface to be shown to the user. The secure content may be transmitted to the user device 104 in an encrypted form, for example, as a hash. In some embodiments, the non-secure content may also be transmitted to the user device 104 in an encrypted form.

In addition to the encrypted data, the activity application 425 may allow the user device 104 to receive one or more decryption keys that can be used to partially or fully decrypt the encrypted content. Alternatively, in some embodiments, the decryption keys that are used to partially or fully decrypt the encrypted content may be at least partially generated at the user device 104, for example by the activity application 425. As an illustration, the user device 104 may use a private key associated with the user device 104 to partially decrypt a hash transmitted by the entity system 108 and encrypted with the corresponding public key of the user device 104. However, the entity system 108 may also transmit one or more additional decryption keys to the user device 104 that can be used to fully decrypt the hash.

The activity application 425 is also configured to cause the received content to display on the user device 104, via the display device 432, with the secure content masked out. For instance, the user device 104 may display the formatting of a graphical user interface and other non-secure information (e.g., a date) but block over or omit at least secure information, such as personal identification information (e.g., the user's name, the user's address, the name of the user's accounts, the amounts in the user's accounts, information or logos that identify the entity with which the user 102 holds accounts, and the like), such that they are not viewable. As an example, the user device 104 may display a number of content fields, with the secure information (e.g., personal identification information) of each content field masked out. As another example, the user device 104 may display a number of content fields, with all information from each content field masked out.

In addition, the activity application 425 is configured to determine, using a cognitive analysis, a portion of displayed masked content that the user 102 is attempting to view. As an illustration, in various embodiments, the user 102 may attempt to view a portion of the content through the smart wearable 106, such as through a pair of smart glasses. The activity application 425 may then determine which portion of the displayed masked content the user 102 is attempting to view through the smart glasses. The activity application 425 may use one or more devices of the user device 104 in making this determination. For example, the activity application 425 may use the camera 450 to track the user's eye movements and/or movements of the smart wearable 106. As another example, the activity application 425 may use one or more user input devices 440, such as a microphone to detect the user speaking and thereby track the user's position in relation to the user device 104. In addition to or instead of using one or more devices of the user device 104, the activity application 425 may use cognitive data received from the smart wearable 106 in determining a portion of the masked content that the user is attempting to view. For example, if the smart wearable 106 is smart glasses, the cognitive data may include data regarding a movement of the user's eyes and/or a movement of the smart glasses that was tracked by the smart glasses, and the activity application 425 may use this cognitive data in making the determination.

In various embodiments, the activity application 425 further allows the user device 104 to generate a cognitive hash that is used in the process for continuous authentication and encryption for selective display of data, as described in further detail below. In addition, the activity application 425 allows the user device 104 to receive the wearable hash from the smart wearable 106 and compare the cognitive and wearable hashes to determine if they are the same. If they are the same, the activity application 425 facilitates the user device 104 in transmitting a decryption key to the smart wearable 106 for the portion of masked content that the activity application 425 determined, using the cognitive analysis, that the user 102 is attempting to view. This process is described in further detail below, in particular with reference to FIGS. 5A, 5B, and 7.

The integrated resource transfer application 423 and the financial data module 427, together, may include the necessary circuitry to provide token storage and transmission functionality and transmitter device signal encoding and decoding functionality to the user device 104, for example, for secure transmission of financial and authentication credential tokens via the contactless communication interface 479 to the entity system 108. That said, in some embodiments the integrated resource transfer application 423 is pre-installed on the user device 104, while in other embodiments, the entity system 108 may transmit and cause installation of the application 423 based on determining that the user device 104 does not comprise the application 423 (e.g., in response to a request by the user 102 on the user device 104).

The processor 410 may be configured to use the network interface device 470 to communicate with one or more devices on the network 101 and the user device-smart wearable network 110, such as, but not limited to the entity system 108 (e.g., via the network 101) and the smart wearable 106 (e.g., via the network 110). In this regard, the network interface device 470 may include an antenna 476 operatively coupled to a transmitter 474 and a receiver 472 (together a "transceiver"), a modem 478, and a contactless communication interface 479. The processor 410 may be configured to provide signals to and receive signals from the transmitter 474 and receiver 472, respectively. The signals may include signaling information in accordance with the air interface standard of the applicable Bluetooth® Low Energy (BLE) standard, cellular system of the wireless telephone network, and the like, that may be part of the network 101 and/or network 110. In this regard, the user device 104 may be configured to operate with one or more air interface standards, communication protocols, modulation types, and access types.

By way of illustration, the user device 104 may be configured to operate in accordance with any of a number of first, second, third, fourth, and/or fifth-generation communication protocols and/or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)); with third-generation (3G) wireless communication protocols, such as Universal Mobile Telecommunications System (UMTS), CDMA2000, wideband CDMA (WCDMA) and/or time division-synchronous CDMA (TD-SCDMA); with fourth-generation (4G) wireless communication protocols; with fifth-generation (5G) wireless communication protocols; and/or the like.

The network interface 470 of the user device 104 may also be configured to operate in accordance with non-cellular communication mechanisms, such as via a wireless local area network (WLAN) or other communication/data networks. The user device 104 may further be configured to operate in accordance Bluetooth® Low Energy (BLE), radio frequency (e.g., NFC, RFID), audio frequency, ultrasound frequency, or other communication/data networks.

The network interface device 470 or communication device 470 may also include a user interface presented by one or more user output devices 430 in order to allow a user 102 to execute some or all of processes described herein. The application interface may have access to the hardware (e.g., the transceiver) and software previously described with respect to the network interface device 470. Furthermore, the user interface may have the ability to connect to and communicate with an external data storage on a separate system within the network 101 and/or the network 110.

As described above, the user device 104 may include user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440 may include any of a number of devices allowing the user device 104 to receive data from a user 102, such as a keypad, keyboard, touch-screen, touchpad, microphone, mouse, joystick, other pointer device, button, soft key, and/or other input device(s).

The user device 104 may further include a power source 415. Generally, the power source 415 may be a device that supplies electrical energy to an electrical load. In some embodiments, the power source 415 may convert a form of energy such as solar energy, chemical energy, mechanical energy, and the like, to electrical energy. Additionally, the power source 415 in the user device 104 may be a battery, such as a lithium battery, a nickel-metal hydride battery, or the like, that is used for powering various circuits, for example the transceiver circuit and other devices that are used to operate the user device 104. Alternatively, the power source 415 may be a power adapter that can connect a power supply from a power outlet to the user device 104. In such embodiments, a power adapter may be classified as a power source "in" the user device 104.

The user device 104 may also include a memory buffer, cache memory, or temporary memory device operatively coupled to the processor 410. Typically, one or more applications (e.g., applications 425 and 423) are loaded into the temporary memory during use. As used herein, memory may include any computer-readable medium configured to store data, code, or other information. For example, the memory may store computer-readable program code including one or more executable portions. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

These features will now be described with respect to the process flow 500 of FIGS. 5A and 5B. As shown in FIGS. 5A and 5B, the process flow 500 is shown both from the perspective of a personal device associated with a user (e.g., the user device 104 associated with the user 102) and from the perspective of a smart wearable associated with the user (e.g., the smart wearable 106 associated with the user 102).

As indicated by block 502, in some instances, the user device 104 receives encrypted data from the entity system 108. In some embodiments, the user device 104 may receive content that has been encrypted by the entity system 108 into discrete portions. As an illustration, the user device 104 may receive a number of hashes from the entity system 108, each hash being the encrypted form of a discrete portion of content. With reference to FIG. 5A, for example, the encrypted data received from the entity system 108 may include "content hash A" and "content hash B," where content hash A is a hash of "content A" and content hash B is a hash of "content B." Additionally, the user device 104 may receive decryption keys for the received encrypted content from the entity system 108. Referring back to the example shown in FIG. 5A, the user device 104 may receive "decryption key A," which may be used to decrypt content hash A to produce content A, and "decryption key B," which may be used to decrypt content hash B to produce content B.

As indicated by block 602, similarly, the smart wearable 106 receives encrypted data from the entity system 108. The difference between block 502 and block 602 is that the smart wearable 106 does not receive decryption keys from the entity system 108, which are reserved for the user device 104.

As indicated by block 504, the user device 104 displays the content received from the entity system 108 as masked content. For example, the user device 104 may display each discrete portion of content but mark out or omit certain information from the content. In some embodiments, the user device 104 may mask personal identification information from the content (e.g., information that identifies the user 102 or accounts and/or resources that the user holds with the entity system 108) when displaying the content. In other embodiments, the user device 104 may mask all information from the content, such that the presence of information can only be inferred from the layout or formatting of the masked and unmasked content (e.g., based on the formatting or design of a graphical user interface including the masked content).

As indicated by block 604, the user 102 simultaneously uses the smart wearable 106 to view the masked content displayed on the user device 104. As an illustration, if the wearable device is smart glasses, the user may view the masked content by looking through the smart glasses at the display device 432 of the user device 104.

As indicated by blocks 506 and 606, the user device 104 and/or the smart wearable 106 determine, using cognitive analysis, that the user 102 is viewing a portion of the masked content through the smart wearable 106. With reference to FIG. 5A, the user device 104 and the smart wearable 106 may determine that the user 102 is viewing "masked content A," which corresponds to content A, through the smart wearable 106. For instance, as discussed above, the encrypted content received from the entity system 108 and displayed by the user device 104, albeit in a masked form, may be in discrete portion. As such, the user device 104 and/or the smart wearable 106 may identify what portion of masked content the user 102 is viewing through the smart wearable 106 and, from that, determine which discrete portion of the encrypted data corresponds to the portion of masked content that the user 102 is viewing on the user device 104.

In some embodiments, the user device 104 may determine that the user 102 is viewing a portion of the masked content performing a cognitive analysis based on data from one or more devices of the user device 104. For example, the user device 104 may use data from the camera 450 to track the user's eye movements to determine that the user 102 is viewing masked content A. In some embodiments, in addition to or instead of using the data from the one or more devices of the user device 104, the user device 104 may determine that the user 102 is viewing a portion of the masked content by performing a cognitive analysis on cognitive data received from the smart wearable 106. As an illustration, the smart wearable 106 may track the user's eye movements or the position of the smart wearable 106 with respect to the user device 104 through one or more devices of the smart wearable 106, such as the camera 302. In some embodiments, the user device 104 may determine the portion of masked content that the user 102 is viewing independently from any determination the smart wearable 106 may make by using, for example, the cognitive data received from the smart wearable 106 and/or the data from the one or more devices of the user device 104. In other embodiments, at least part of the determination of the portion of masked content the user 102 is viewing may be made by the smart wearable 106 and transmitted to the user device 104.

As indicated by block 508, once the user device 104 and/or the smart wearable 106 have determined a portion of masked content that the user 102 is viewing, the user device 104 identifies a decryption key for the portion of masked content. With respect to FIG. 5A, the user device 104 identifies that "decryption key A" corresponds to masked content A that the user 102 is viewing. In some instances, the user device 104 and/or the smart wearable 106 may determine that the portion of the masked content being viewed by the user 102 (e.g., masked content A) corresponds to a discrete portion of the encrypted content (e.g., encrypted content A), and the user device 104 may identify that a specific decryption key or set of decryption keys (e.g., decryption key A) can be used to decrypt the discrete portion of the encrypted content. As discussed above, these decryption key(s) may be transmitted by the entity system 108 and/or generated at the user device 104.

As indicated by block 510, the user device 104 computes a cognitive hash using a hash algorithm. For example, in some instances, the user device 104 may compute the cognitive hash in response to receiving a request from the smart wearable 106 for the decryption key (e.g., decryption key A) corresponding to the portion of masked content the user is viewing. As indicated by block 610, the smart wearable 106 similarly computes a wearable hash using a hash algorithm. In various embodiments, the hash algorithm used by the user device 104 to compute the cognitive hash is the same algorithm used by the smart wearable 106 to compute the wearable hash. With reference to FIG. 5A, the user device 104 computes "cognitive hash A," and the smart wearable 106 computes "wearable hash A."

As indicated by block 612, the smart wearable 106 transmits the wearable hash (e.g., wearable hash A) to the user device 104. For example, the user device 104 and the smart wearable 106 may have previously established a communication channel using short-range communication protocols, such as by using Bluetooth®, RFID, or NFC technology. Accordingly, the smart wearable 106 may transmit the wearable hash to the user device 104 via the short-range communication channel.

As indicated by block 512, the user device 104 receives the wearable hash and compares the cognitive hash to the wearable hash. With reference to FIG. 5A, the user device 104 compares the cognitive hash A to the wearable hash A. As indicated by block 514, if the user device 104 determines that the wearable hash matches the cognitive hash, the user device 104 transmits the decryption key for the portion of masked content that the user 102 has been determined to be viewing on the user device 104 to the smart wearable 106. With reference to FIG. 5A, the user device 104 thus transmits decryption key A, corresponding to content hash A, to the smart wearable 106. For example, the user device 104 may transmit the decryption key (e.g., decryption key A) to the smart wearable 106 via the established short-range communication channel. As such, as indicated by block 614, the smart wearable 106 receives the decryption key (e.g., decryption key A) from the user device 104, provided that the cognitive hash matches the wearable hash. Alternatively, if the user device 104 determines that the cognitive hash does not match the wearable hash, the user device 104 does not transmit the decryption key, and the user 102 is denied access to the content (e.g., content A).

As indicated by block 616, the smart wearable 106 uses the received decryption key to decrypt the portion of content that the user 102 has been determined to be trying to view on the user device 104. In various embodiments, the smart wearable 106 may use a decryption algorithm with the received decryption key to decrypt the discrete portion of the encrypted content, which the smart wearable 106 also received from the entity system 108, that corresponds to the portion of masked content that the user 102 is viewing. For example, the discrete portion of the encrypted content may be a content hash that corresponds to the portion of masked content that the user 102 is viewing. With reference to FIG. 5A, the smart wearable 106 uses the received decryption key A to decrypt content A from content hash A, which corresponds to masked content A.

As indicated by block 618, the smart wearable 106 displays the decrypted content to the user 102. With reference to FIG. 5B, the smart wearable 106 displays the decrypted content A. The smart wearable 106 may display the decrypted content by any suitable device of the smart wearable 106. For example, if the smart wearable 106 is smart glasses, the smart wearable 106 may display the decrypted content using a liquid crystal display (LCD) screen of the smart wearable 106 that is overlaid over a portion of the user's sightline.

As indicated by blocks 520 and 620, the user device 104 and/or the smart wearable 106 may subsequently determine that the user 102 is viewing a second portion of the masked content through the smart wearable 106. With reference to FIG. 5B, the user device 104 and the smart wearable 106 may determine that the user 102 is viewing "masked content B," which corresponds to content B, through the smart wearable 106. In various embodiments, the user device 104 and/or the smart wearable 106 may determine that the user 102 is viewing the second portion of masked content similarly to the process described above with reference to blocks 506 and 606.

As indicated by block 522, once the user device 104 and/or the smart wearable 106 have determined that the user 102 is viewing the second portion of masked content, the user device 104 identifies a decryption key for the second portion of masked content. With respect to FIG. 5B, the user device 104 identifies that "decryption key B" corresponds to masked content B that the user 102 is viewing. In various embodiments, the user device may identify the decryption key similarly to the process described above with reference to block 508.

As indicated by block 524, the user device 104 computes a cognitive hash using a hash algorithm and the content hash corresponding to the portion of content that was previously viewed by the user 102. In some instances, for example, the user device 104 may compute the cognitive hash in response to receiving a request from the smart wearable 106 for the decryption key corresponding to the portion of masked content that the user 102 is attempting to view. Accordingly, with reference to FIG. 5B, the user device 104 computes "cognitive hash B" based on a hash algorithm and content hash A, for example by inputting content hash A into the hash algorithm. As indicated by block 624, the smart wearable 106 may similarly compute a wearable hash using a hash algorithm and the content hash corresponding to the portion of content that was previously viewed by the user 102. As such, with reference to FIG. 5B, the user device 104 computes "wearable hash B" based on a hash algorithm and content hash A, for example by inputting content hash A into the same algorithm used by the user device 104.

This is done, for example, because only the smart wearable 106 that was previously in electronic communication with the user device 104 will know the previous content hash that was decrypted (e.g., in the example of FIGS. 5A and 5B, content hash A). As such, this helps ensure that the user device 104 does not transmit decryption keys for the encrypted content to devices other than the smart wearable 106 being used by the user 102. Thus, the system provides for continuous authentication of the smart wearable 106.

As indicated by block 626, the smart wearable 106 transmits the wearable hash (e.g., wearable hash B) to the user device 104. In various embodiments, the smart wearable 106 may transmit the wearable hash to the user device similarly to the process described above with reference to block 612.

As indicated by block 526, the user device 104 receives the wearable hash and compares the cognitive hash to the wearable hash. With reference to FIG. 5B, the user device 104 compares the cognitive hash B to the wearable hash B. As indicated by block 528, if the user device 104 determines that the wearable hash matches the cognitive hash, the user device 104 may transmit the decryption key for the portion of masked content that the user 102 has been determined to be viewing to the smart wearable 106. With reference to FIG. 5B, the user device 104 thus transmits decryption key B, corresponding to content hash B, to the smart wearable 106. In various embodiments, the user device 104 transmits the decryption key to the smart wearable 106 similarly to the process described above with reference to block 514. As such, as indicated by block 628, the smart wearable 106 receives the decryption key (e.g., decryption key B) from the user device 104, provided that cognitive hash and the wearable hash are the same. Alternatively, if the user device 104 determines that the cognitive hash does not match the wearable hash, the user device 104 does not transmit the decryption key, and the user 102 is denied access to the content (e.g., content B).

As indicated by block 630, the smart wearable 106 uses the received decryption key to decrypt the portion of content that the user has been determined to be attempting to view on the user device 104. In various embodiments, the smart wearable 106 decrypts the portion of masked content similarly to the process described above with reference to block 616. With reference to FIG. 5B, the smart wearable 106 uses the received decryption key B to decrypt content B from content hash B.

As indicated by block 632, the smart wearable 106 displays the decrypted content to the user 102. With reference to FIG. 5B, the smart wearable 106 displays the decrypted content A. In various embodiments, the smart wearable 106 may display the decrypted content similarly to the process described above with reference to block 618.

It should be understood that the process flow 500 can be extended beyond what is shown in FIGS. 5A and 5B for additional portions of masked content that the user views through the smart wearable 106. For example, after block 632, the use may view a third portion of masked content (e.g., "masked content C") through the smart wearable 106, with masked content C corresponding to "content C" that is encrypted as "content hash C." The user device 104 and/or the smart wearable 106 may determine that the user is viewing masked content C, and the user device 104 may identify that "decryption key C" corresponds to content hash C. Then the user device 104 may compute "cognitive hash C" from the hash algorithm and content hash B, and the smart wearable 106 may compute "wearable hash C" from the hash algorithm and content hash B. The smart wearable 106 may transmit the wearable hash C to the user device 104, and the user device 104 may compare the cognitive hash C to the wearable hash C. If the two hashes match, the user device 104 may transmit decryption key C to the smart wearable 106, which may use decryption key C to decrypt content C from content hash C. The user device 104 may then display content C to the user. This process may continue with further content (e.g., content D, content E, content F, and so on) such that the process flow 500 is performed continuously to authenticate the smart wearable 106 and allow for selective decryption of content for the user to view.

These features will also be described with respect to the process flow 700 of FIG. 6 and the process flow 800 of FIG. 7. The process flow 700 is shown from the perspective of a smart wearable device (e.g., the smart wearable 106), and the process flow 800 is shown from the perspective of a user device (e.g., the user device 104). Starting with the process flow 700 of FIG. 6, as indicated by block 702, the smart wearable 106 receives encrypted content from the entity (e.g., from the entity system 108). For example, the smart wearable may receive content that has been encrypted by the entity system 108 into discrete portions, such as into content hashes as described above.

As indicated by block 704, the smart wearable 106 may determine whether the user (e.g., user 102) is viewing a portion of masked content that is displayed on the user device 104. The smart wearable 106 may make this determination similarly to the process described above with respect to blocks 506 and 606 of FIG. 5A. For example, the smart wearable 106 may gather cognitive information about the user's eye movements and/or information about a location of the smart wearable 106 with respect to the user device 104 and transmit this gathered information to the user device 104. As another example, the smart wearable 106 may determine where the user is looking on the user device 104 and identify the portion of the masked content that the user is viewing from the gathered content. The smart wearable 106 may then transmit this determination to the user device 104. Alternatively, in some embodiments, the smart wearable 106 may not participate in determining the portion of the masked content that the user 102 is viewing. Instead, the smart wearable 106 may receive an indication of the portion of masked content that the user 102 is viewing from the user device 104.

If the smart wearable 106 determines that the user 102 is not viewing a portion of the masked content, or if the smart wearable 106 and/or the user device 104 cannot determine what portion of the masked content that the user 102 is viewing, the smart wearable 106 continues to determine whether the user 102 is viewing a portion of masked content. Otherwise, as indicated by block 708, if the smart wearable 106 determines that the user 102 is viewing a portion of the masked content, the smart wearable 106 computes a wearable hash. The smart wearable 106 may compute the wearable hash as described above with respect to blocks 610 and 624 of FIGS. 5A and 5B. For example, the smart wearable 106 may compute the wearable hash by inputting a content hash for the content that the user previously viewed into a hash algorithm.

As indicated by block 708, the smart wearable 106 then transmits the wearable hash to the user device 104. In various embodiments, the smart wearable 106 may transmit the wearable hash to the user device similarly to the process described with respect to block 612 of FIG. 5A. Additionally, in some instances, the smart wearable 106 may transmit the wearable hash along with a request for the decryption key that corresponds to the portion of masked content that the user is viewing, which may trigger the user device 104 to compute a cognitive hash as described above. In other instances, the user device 104 may automatically compute a cognitive hash, for example in response to determining that the user is viewing a portion of masked content.

As indicated by block 710, the smart wearable 106 determines whether the smart wearable 106 has received the decryption key for the masked content that the user is viewing. If the smart wearable 106 does not receive the decryption key, the smart wearable 106 returns to determining whether the user is viewing a portion of masked content at block 704. For example, the smart wearable 106 may wait a certain amount of time to receive the decryption key after transmitting the wearable hash to the user device 104 and may return to determining whether the user is viewing a portion of masked content if the decryption key is not received in that time. In some cases, the smart wearable 106 may be paired with the user device 104 (e.g., using Bluetooth® technology) before block 704, and the smart wearable 106 may need to be re-paired with the user device 104 if the smart wearable 106 does not receive the decryption key from the user device 104 within a certain amount of time after transmitting the wearable hash to the user device 104.

Otherwise, as indicated by block 712, if the smart wearable 106 receives the decryption key, the smart wearable 106 decrypts the content using the decryption key. In various embodiments, the smart wearable 106 may decrypt the content similarly to the process described above with reference to block 616 of FIG. 5A. As indicated by block 714, the smart wearable 106 then displays the decrypted content to the user 102. In various embodiments, the smart wearable 106 may display the decrypted content similarly to the process described above with reference to block 618 of FIG. 5B. After or while displaying the decrypted content, the smart wearable 106 returns to determining whether the user is viewing a portion of the masked content displayed on the user device 104, as indicated by block 704.

Continuing with the process flow 800 of FIG. 7 shown from the perspective of the user device 104, as indicated by block 802, the user device 104 receives encrypted content from the entity (e.g., from the entity system 108). For example, the smart wearable may receive content that has been encrypted by the entity system 108 into discrete portions, such as into content hashes as described above.

As indicated by block 804, the user device 104 displays masked content. In various embodiments, the user device 104 may display the masked content using a similar process as described above with respect to block 504 of FIG. 5A.

As indicated by block 806, the user device 104 determines, using cognitive analysis, whether the user (e.g., user 102) is viewing a portion of masked content that is displayed on the user device 104. The user device 104 may make this determination similarly to the process described above with respect to blocks 506 and 606 of FIG. 5A. For example, the user device 104 may gather information about the user's eye movements and/or information about a location of the smart wearable 106 with respect to the user device 104 and make the determination based on this information. In some embodiments, the user device 104 may make this determination based solely on the information gathered by the user device 104, for example by the display device 432 and/or a microphone of the user device 104. In other embodiments, the user device 104 may make this determination based on information gathered by the user device 104 and on cognitive information from an external device. For example, the user device 104 may receive and use cognitive data from the smart wearable 106, for example tracking the user's eye movements. In other embodiments, the user device 104 may receive a determination of which portion of masked content the user 102 is viewing from the smart wearable 106.

If the user device 104 determines that the user 102 is not viewing a portion of the masked content, or if the user device 104 and/or smart wearable 106 cannot determine what portion of the masked content that the user 102 is viewing, the user device 104 continues to determine whether the user 102 is viewing a portion of masked content. Otherwise, as indicated by block 808, if the user device 104 determines that the user 102 is viewing a portion of the masked content, the user device 104 identifies a decryption key that is associated with the portion of viewed masked content. The user device 104 may identify the decryption key using a similar process as described above with respect to block 508 of FIG. 5A.

As indicated by block 810, the user device 104 computes a cognitive hash. The user device 104 may compute the cognitive hash as described above with respect to blocks 610 and 624 of FIGS. 5A and 5B. For example, the user device 104 may compute the cognitive hash by inputting a content hash for the content that the user previously viewed into a hash algorithm. In some instances, the user device 104 may compute the cognitive hash automatically, such as in response to determining that the user is viewing a portion of the masked content. In other instances, the user device 104 may compute the cognitive hash in response to a request from the smart wearable 106 for the decryption key, for example transmitted with a wearable hash from the smart wearable 106.

As indicated by block 812, the user device 104 receives a corresponding wearable hash from the smart wearable 106. For example, the user device 104 may receive the wearable hash via a previously established communication channel between the user device 104 and the smart wearable 106, such as by using Bluetooth® technology. Once the user device 104 receives the corresponding wearable hash, as indicated by block 814, the user device 104 compares the cognitive hash to the wearable hash to determine whether the cognitive hash matches the wearable hash. If the cognitive hash does not match the wearable hash, as indicated by block 816, the user device 104 does not transmit the decryption key to the smart wearable 106, thus denying the user 102 access to the portion of masked content that the user 102 is viewing through the smart wearable 106. Otherwise, if the cognitive hash does match the wearable hash, as indicated by block 818, the user device 104 transmits the decryption key to the smart wearable 106, which can then use the decryption key to decrypt the content hash corresponding to the portion of masked content that the user is viewing. The user device 104 then returns to determining whether the user is viewing a portion of masked content, as indicated by block 806.

FIG. 8 illustrates a representation of a graphical user interface 900 for display on a user device (e.g., user device 104), in accordance with some embodiments of the invention. Specifically, the graphical user interface 900 is an example interface that may be traditionally shown to users. As shown, the graphical user interface 900 may include a content field 902 acknowledging the user 102 (e.g., as illustrated in FIG. 8, "Customer"), as well as a number of content fields 904, 906, 908, 910, and 912 listing accounts that the user holds with the entity. For example, as illustrated in FIG. 8, content field 904 may show "Savings Acct.— Acct. 1," content field 906 may show "Business Checking Acct.—Acct. 2," content field 908 may show "Business Expense Acct.—Acct. 3," content field 910 may show "Business Expense Acct.—Acct. 4," and content field 912 may show "Mortgage Acct.—Acct. 5". The content fields 904, 906, 908, 910, and 912 may also include the amounts of a resource that the user holds in each of the accounts.

As described above, however, third parties may be able to view the graphical user interface 900 displayed on the user device 104. For example, an onlooker near the user 102 may view the graphical user interface 900 on the user device 104 and be able to see the information displayed on the graphical user interface 900, including the acknowledgement of the user 102, the names of the user's accounts, and the amounts in each of the user's accounts. Accordingly, it may be desirable to mask the information shown on the graphical user interface 900 as further described above. FIG. 9 illustrates another representation of a graphical user interface 1000 for display on a user device (e.g., user device 104), in accordance with some embodiments of the invention. The graphical user interface 1000 is an example interface that masks the content that is displayed on the user device 104. As such, while the graphical user interface 1000 generally matches the format of the graphical user interface 900 of FIG. 8, the graphical user interface 1000 marks over the sensitive or secure content that is displayed, including personal identifying information corresponding to the user 102 and the user's accounts, such that it is not viewable by either the user 102 or a third party on the user device 104. For example, content field 1002 matches content field 902 of interface 900, but content field 1002 masks out the acknowledgement of the user 102. Similarly, content fields 1004, 1006, 1008, 1010, and 1012 match content fields 904, 906, 908, 910, and 912 of graphical user interface 900, but content fields 1004, 1006, 1008, 1010, and 1012 mask out the names of the user's accounts and the amounts in the user's accounts. Alternatively, in some embodiments, a graphical user interface similar to the graphical user interface 1000 shown in FIG. 9 may mask all information displayed on the user device 104. For example, the terms "Accounts," "Bill Pay," "Transfer|Send," and "Bank Accounts" may all be masked out in some embodiments.

FIG. 10 illustrates a representation of connections between the graphical user interface 1000 and decryption keys, in accordance with some embodiments of the invention. As shown in FIG. 10, each of the content fields 1004, 1006, 1008, 1010, and 1012 has a corresponding decryption key. Specifically, in the example of FIG. 10, content field 1004 corresponds to decryption key 1104, content field 1006 corresponds to decryption key 1106, content field 1008 corresponds to decryption key 1108, content field 1010 corresponds to decryption key 1110, and content field 1012 corresponds to decryption key 1112. Accordingly, once the user device 104 and the smart wearable 106 determine that the user is viewing one of the content fields 1004, 1006, 1008, 1010, or 1012, for example as described with reference to process flows 500, 700, and 800 above, and the user device 104 verifies that the cognitive hash determined by the user device 104 matches the wearable hash determined by the smart device 106 as also described in further detail above, the user device 104 may transmit the corresponding decryption key 1104, 1106, 1108, 1110, or 1112 to the smart wearable 106. The smart wearable 106 may then use the received decryption key 1104, 1106, 1108, 1110, or 1112 to decrypt the content hash corresponding to the content field 1004, 1006, 1008, 1010, or 1012 that the user is attempting to view to produce the corresponding decrypted content.

FIG. 11 illustrates a representation of the graphical user interface 1000 being viewed by a user (e.g., user 102) a smart wearable device (e.g., smart wearable 106, embodied in FIG. 11 as smart glasses), in accordance with some embodiments of the invention. In the example of FIG. 11, the smart wearable 106 is viewing content field 1010 of interface 1000. As such, once this is determined by the user device 104 and/or the smart wearable 106, the user device 104 determines that a cognitive hash computed by the user device 104 and a wearable hash computed by the smart wearable 106 are the same, and the smart wearable 106 receives the decryption key corresponding to content field 1010 (e.g., decryption key 1110 of FIG. 10), as described in further detail above. The smart wearable 106 may then decrypt a content hash corresponding to content field 1010 using the decryption key 1110. Next, as shown in FIG. 11, the smart wearable 106 may display the decrypted content 1200 to the user 102 via the display 306 of the smart wearable 106.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the continuous authentication and encryption processes and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive of, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for continuous authentication and encryption, the system comprising:
   a memory device with computer-readable program code stored thereon;
   a communication device;
   a display device; and
   a processing device operatively coupled to the memory device, communication device, and display, wherein the processing device is configured to execute the computer-readable program code to:
   receive content from an entity system;
   display the content as masked content via the display;
   determine, using cognitive analysis, that a user wearing smart glasses is viewing a first portion of the masked content through the smart glasses, wherein the first portion of the masked content is associated with a first content hash, wherein the cognitive analysis comprises using a camera of the user device to determine at least one of a movement of eyes of the user or a movement of the smart glasses;
   identify a first decryption key associated with the first content hash;
   determine a first cognitive hash;
   receive a first wearable hash from the smart glasses;
   compare the first cognitive hash to the first wearable hash; and
   in response to the first cognitive hash matching the first wearable hash, transmit the first decryption key to the smart glasses.

2. The system of claim 1, wherein the processing device is further configured to execute the computer-readable program code to:
   determine, using cognitive analysis, that the user wearing the smart glasses is viewing a second portion of the masked content through the smart glasses, wherein the second portion of the masked content is associated with a second content hash;
   identify a second decryption key associated with the second content hash;
   determine a second cognitive hash;
   receive a second wearable hash from the smart glasses;
   compare the second cognitive hash to the second wearable hash; and in response to the second cognitive hash matching the second wearable hash, transmit the second decryption key to the smart glasses.

3. The system of claim 2, wherein determining the second cognitive hash comprises computing the second cognitive hash based on a hash algorithm and the first content hash.

4. The system of claim 3, wherein the second wearable hash is computed based on the hash algorithm and the first content hash.

5. The system of claim 1, wherein the processing device is further configured to execute the computer-readable program code to receive cognitive data from the smart glasses, the cognitive data comprising at least one of data regarding a movement of eyes of the user or a movement of the smart glasses, and wherein the cognitive analysis comprises using the cognitive data from the smart glasses.

6. The system of claim 1, wherein displaying the masked content comprises displaying a plurality of content fields, wherein all identifying information of each content field is masked out.

7. The system of claim 1, wherein displaying the masked content comprises displaying a plurality of content fields, wherein personal identification information of each content field is masked out.

8. A computer-implemented method for continuous authentication and encryption, the method comprising:
receiving, at a user device, content from an entity system;
displaying, via a display device of the user device, the content as masked content;
determining, using cognitive analysis, that a user wearing smart glasses is viewing a first portion of the masked content through the smart glasses, wherein the first portion of the masked content is associated with a first content hash, wherein the cognitive analysis comprises using a camera of the user device to determine at least one of a movement of eyes of the user or a movement of the smart glasses;
identifying a first decryption key associated with the first content hash;
determining, at the user device, a first cognitive hash;
receiving, at the user device, a first wearable hash from the smart glasses;
comparing the first cognitive hash to the first wearable hash; and
in response to the first cognitive hash matching the first wearable hash, transmitting the first decryption key to the smart glasses.

9. The computer-implemented method of claim 8, further comprising:
determining, using cognitive analysis, that the user wearing the smart glasses is viewing a second portion of the masked content through the smart glasses, wherein the second portion of the masked content is associated with a second content hash;
identifying a second decryption key associated with the second content hash;
determining, at the user device, a second cognitive hash;
receiving, at the user device, a second wearable hash from the smart glasses;
comparing the second cognitive hash to the second wearable hash; and
in response to the second cognitive hash matching the second wearable hash, transmitting the second decryption key to the smart glasses.

10. The computer-implemented method of claim 9, wherein determining the second cognitive hash comprises computing the second cognitive hash based on a hash algorithm and the first content hash.

11. The computer-implemented method of claim 10, wherein the second wearable hash is computed based on the hash algorithm and the first content hash.

12. The computer-implemented method of claim 8, further comprising receiving cognitive data from the smart glasses, the cognitive data comprising at least one of data regarding a movement of eyes of the user or a movement of the smart glasses, and wherein the cognitive analysis comprises using the cognitive data from the smart glasses.

13. The computer-implemented method of claim 8, wherein displaying the masked content comprises displaying a plurality of content fields, wherein all identifying information of each content field is masked out.

14. The computer-implemented method of claim 8, wherein displaying the masked content comprises displaying a plurality of content fields, wherein personal identification information of each content field is masked out.

15. A computer program product for continuous authentication and encryption with at least one non-transitory computer-readable medium having computer-readable program code portions embodied therein, the computer-readable program code portions comprising:
an executable portion configured for receiving content from an entity system;
an executable portion configured for displaying the content as masked content;
an executable portion configured for determining, using cognitive analysis, that a user wearing smart glasses is viewing a first portion of the masked content through the smart glasses, wherein the first portion of the masked content is associated with a first content hash, wherein the cognitive analysis comprises using a camera of the user device to determine at least one of a movement of eyes of the user or a movement of the smart glasses;
an executable portion configured for identifying a first decryption key associated with the first content hash;
an executable portion configured for determining a first cognitive hash;
an executable portion configured for receiving a first wearable hash from the smart glasses;
an executable portion configured for comparing the first cognitive hash to the first wearable hash; and
an executable portion configured for transmitting the first decryption key to the smart glasses in response to the first cognitive hash matching the first wearable hash.

16. The computer program product of claim 15, further comprising:
an executable portion configured for determining, using cognitive analysis, that the user wearing the smart glasses is viewing a second portion of the masked content through the smart glasses, wherein the second portion of the masked content is associated with a second content hash;
an executable portion configured for identifying a second decryption key associated with the second content hash;
an executable portion configured for determining a second cognitive hash;
an executable portion configured for receiving a second wearable hash from the smart glasses;
an executable portion configured for comparing the second cognitive hash to the second wearable hash; and an executable portion configured for transmitting the second decryption key to the smart glasses in response to the second cognitive hash matching the second wearable hash.

17. The computer program product of claim 16, wherein determining the second cognitive hash comprises computing the second cognitive hash based on a hash algorithm and the first content hash.

18. The computer program product of claim 17, wherein the second wearable hash is computed based on the hash algorithm and the first content hash.

* * * * *